(12) United States Patent
Viswanathan et al.

(10) Patent No.: US 12,455,924 B2
(45) Date of Patent: Oct. 28, 2025

(54) GENERATING GRAPH-BASED TAXONOMIES VIA GRAPHICAL USER INTERFACE TOOLS FOR GENERATING REPRESENTATIVE DATA OBJECTS AND CUSTOMIZING ATTRIBUTES

(71) Applicant: OneTrust LLC, Atlanta, GA (US)

(72) Inventors: Subramanian Viswanathan, San Ramon, CA (US); Arun Suresh, Atlanta, GA (US); Ravi Bhattiprolu, Cumming, GA (US)

(73) Assignee: OneTrust LLC, Atlanta, GA (US)

( * ) Notice: Subject to any disclaimer, the term of this patent is extended or adjusted under 35 U.S.C. 154(b) by 0 days.

(21) Appl. No.: 18/472,893

(22) Filed: Sep. 22, 2023

(65) Prior Publication Data

US 2025/0103652 A1    Mar. 27, 2025

(51) Int. Cl.
*G06F 16/00*       (2019.01)
*G06F 16/901*      (2019.01)
*G06F 16/904*      (2019.01)

(52) U.S. Cl.
CPC ........ *G06F 16/9024* (2019.01); *G06F 16/904* (2019.01)

(58) Field of Classification Search
CPC ............................ G06F 16/9024; G06F 16/904
See application file for complete search history.

(56) References Cited

U.S. PATENT DOCUMENTS

| | | | |
|---|---|---|---|
| 9,686,308 B1* | 6/2017 | Srivastava | H04L 12/14 |
| 2019/0065569 A1* | 2/2019 | Boutros | G06F 16/212 |
| 2020/0011784 A1* | 1/2020 | Chalumuri | G06Q 10/20 |
| 2021/0182659 A1* | 6/2021 | Makhija | G06V 30/147 |

* cited by examiner

*Primary Examiner* — Syed H Hasan
(74) *Attorney, Agent, or Firm* — Ballard Spahr LLP

(57) ABSTRACT

Methods, systems, and non-transitory computer readable storage media are disclosed for dynamically generating and modifying interactive graph-based taxonomies associated with data processes in various domains. The disclosed system generates node data objects representing a domain-category hierarchy in connection with one or more computing data processes via a library of tools. The disclosed systems generates an attribute data object corresponding to an attribute assigned to a node data object in the graph-based taxonomy and links the attribute data object to node data objects according to parent/child relationships of the hierarchy. The disclosed system utilizes the parent/child relationships of the node data objects and attribute data object to aggregate attribute values of the attributes according to one or more aggregation operations. The disclosed systems provide indications of the aggregated attribute values for display via a graphical user interface for use in performing data processes.

20 Claims, 17 Drawing Sheets

| Domain Register | | | | | | | |
|---|---|---|---|---|---|---|---|
| Default View > | | | 800 | Search... | Add Domain | Export | ⋯ ▼ |
| ☐ ID | Domain Name | Domain Statement Name | Description | Measurement 1 | Measurement 2 | Organization | Source | Domain Owners | Type |
| ☐ 1 | 4 | ⋮⋮⋮⋮ | ⋮⋮⋮⋮ | ⋮⋮⋮⋮ | ⋮⋮⋮⋮ | Domain Hierarchy - Ravi | ⋮⋮⋮⋮ | ⋮⋮⋮⋮ | Gener |
| ☐ 2 | G | ⋮⋮⋮⋮ | ⋮⋮⋮⋮ | ⋮⋮⋮⋮ | ⋮⋮⋮⋮ | Domain Hierarchy - Ravi | ⋮⋮⋮⋮ | ⋮⋮⋮⋮ | Gener |
| ☐ 3 | r2 | ⋮⋮⋮⋮ | ⋮⋮⋮⋮ | ⋮⋮⋮⋮ | ⋮⋮⋮⋮ | Domain Hierarchy - Ravi | ⋮⋮⋮⋮ | ⋮⋮⋮⋮ | Gener |
| ☐ 4 | R1 | ⋮⋮⋮⋮ | ⋮⋮⋮⋮ | ⋮⋮⋮⋮ | ⋮⋮⋮⋮ | Domain Hierarchy - Ravi | ⋮⋮⋮⋮ | ⋮⋮⋮⋮ | Gener |

Showing 1 – 4 of 4

*Fig. 8*

Create new domain

Please fill out the fields below to create a domain

○ Select from Domain Statemets
● Create New Domain

＊Organization
[Organization ▽]

Inherent Domain Level
[☐]

Domain Name
[Edit Domain Name]

Threat
[Threat]

Vulnerability
[Vulnerability]

Category
[Category]

Domain Owners
[Please Select Domain Owner]

Domain Approver
[Please Select approver]

Deadline
[Select Date]

Reminder
[Days before the Deadline]

Create Domain

Previous

```
┌─────────────────────────────────────────────────────────────┐
│ Generating Node Data Objects Representing A Domain And Categories Of │
│       The Domain Within A Graph-Based Taxonomy 1602          │
└─────────────────────────────────────────────────────────────┘
                              │
                              ▼
┌─────────────────────────────────────────────────────────────┐
│ Receiving An Input To Assign An Attribute To A Selected Node Data Object │
│                           1604                               │
│  ┌───────────────────────────────────────────────────────┐  │
│  │        Generating An Attribute Data Object 1604a      │  │
│  └───────────────────────────────────────────────────────┘  │
│                                                             │
│  ┌───────────────────────────────────────────────────────┐  │
│  │ Linking The Attribute Data Object To Node Data Objects 1604b │  │
│  └───────────────────────────────────────────────────────┘  │
└─────────────────────────────────────────────────────────────┘
                              │
                              ▼
┌─────────────────────────────────────────────────────────────┐
│            Determining Aggregated Attribute Values 1606      │
└─────────────────────────────────────────────────────────────┘
                              │
                              ▼
┌─────────────────────────────────────────────────────────────┐
│ Providing An Indication Of The Aggregated Attribute Values For Display Via │
│            A Graphical User Interface 1608                   │
└─────────────────────────────────────────────────────────────┘
```

*Fig. 16*

GENERATING GRAPH-BASED TAXONOMIES VIA GRAPHICAL USER INTERFACE TOOLS FOR GENERATING REPRESENTATIVE DATA OBJECTS AND CUSTOMIZING ATTRIBUTES

BACKGROUND

Advances in computer processing and data storage technologies have led to a significant increase in the amount and types of data moved to digital environments for processing and management. Specifically, many entities utilize computing devices to store, analyze, transmit, and/or perform a number of computing operations on different types of data in various computing environments. Computing systems handling (e.g., collecting, receiving, transmitting, storing, processing, sharing, and/or the like) certain types of digital data are often subject to handling such data in a compliant manner according to different system requirements frameworks (e.g., requirements for handling data in specific ways via certain processes, limitations, or capabilities) for security, privacy, or other reasons. For example, entities that provide data processes in connection with personal security, medical industries, network security, etc., often collect, receive, transmit, store, process, or share information (e.g., personally identifiable information or "PII") covered by one or more system requirements frameworks.

Furthermore, many entities encounter various risks or other entity-wide effects as a result of handling data and/or providing data processes associated with data subject to system requirements frameworks and/or in other computing environments. For example, in connection with providing data processes in computing environments, many entities have a large number of different computing systems, devices, and/or groups able to access and/or modify the data processes or associated data. To illustrate, large organizations can have many different departments (e.g., corresponding to different domains), each with their own set of devices having access to the same datasets. Furthermore, each department may have their own datasets that relate to other datasets associated with other departments or which are covered by the same system requirements frameworks. Determining how decisions and interactions with specific data creates effects across different domains involving many different computing devices and systems can be challenging due to the disjointed/siloed nature of the different domains, especially when determining the effects of certain risks or risk types across the domains. Conventional systems lack the ability to effectively manage such environments involving computing systems across a number of different domains handling specific data types while understanding the effects of each domain on the other domains or on an entity as a whole.

As an example, managing a database containing PII data associated with a plurality of domains can increase the risk of a data breach with every additional computing device having access to the database. Conventional systems involved in managing digital data for an entity typically utilize account management and mitigation practices (e.g., via an information technology department) to limit access to such data and reduce the risks of data breaches. Such conventional systems, however, are limited to assessing compliance with the specific controls implemented to limit the access to the data within the environment of the specific domain due to the lack of communication, reporting, and accessibility of computing devices of the respective domains. Accordingly, the conventional systems lack the ability to determine the relationships and corresponding effects across the different domains due to controls (or lack thereof) implemented at computing systems in one or more specific domains.

SUMMARY

This disclosure describes various aspects for providing a library of tools that dynamically generate and modify interactive graph-based taxonomies associated with data processes in various domains. For example, the disclosed systems generate node data objects representing a domain and categories of the domain within a graph-based taxonomy in response to inputs via one or more devices utilizing the tools. Specifically, the disclosed systems generate the graph-based taxonomy to represent relationships between the node data objects in connection with computing systems that provide data processes associated with the domain. Additionally, the disclosed systems generate one or more attribute data objects corresponding to one or more attributes assigned to various node data objects in the graph-based taxonomy and link the attribute data object(s) to node data objects according to the parent/child relationships associated with the node data objects within the graph-based taxonomy. Furthermore, the disclosed systems utilize the relationships of the node data objects and attribute data object(s) (e.g., based on the taxonomy hierarchy) to aggregate attribute values of the attributes according to one or more aggregation operations. The disclosed systems provide indications of the aggregated attribute values for display via the graphical user interface for use in performing data processes. Thus, the disclosed systems provide an interactive taxonomy generation and modification interface for quickly and easily determining the effects of relationships on various different computing environments according to risks or other attributes within and across domains.

BRIEF DESCRIPTION OF THE DRAWINGS

Various embodiments will be described and explained with additional specificity and detail through the use of the accompanying drawings.

FIG. 8 illustrates an example of a graphical user interface for defining domains in a domain register in accordance with one or more embodiments.

FIG. 9 illustrates an example of a graphical user interface for generating a new domain for a domain register in accordance with one or more embodiments.

FIG. 16 illustrates an example flowchart of a process for linking an attribute to nodes in a graph-based taxonomy via corresponding data objects and aggregating attribute values for the attribute in accordance with one or more embodiments.

DETAILED DESCRIPTION

Figure 1:
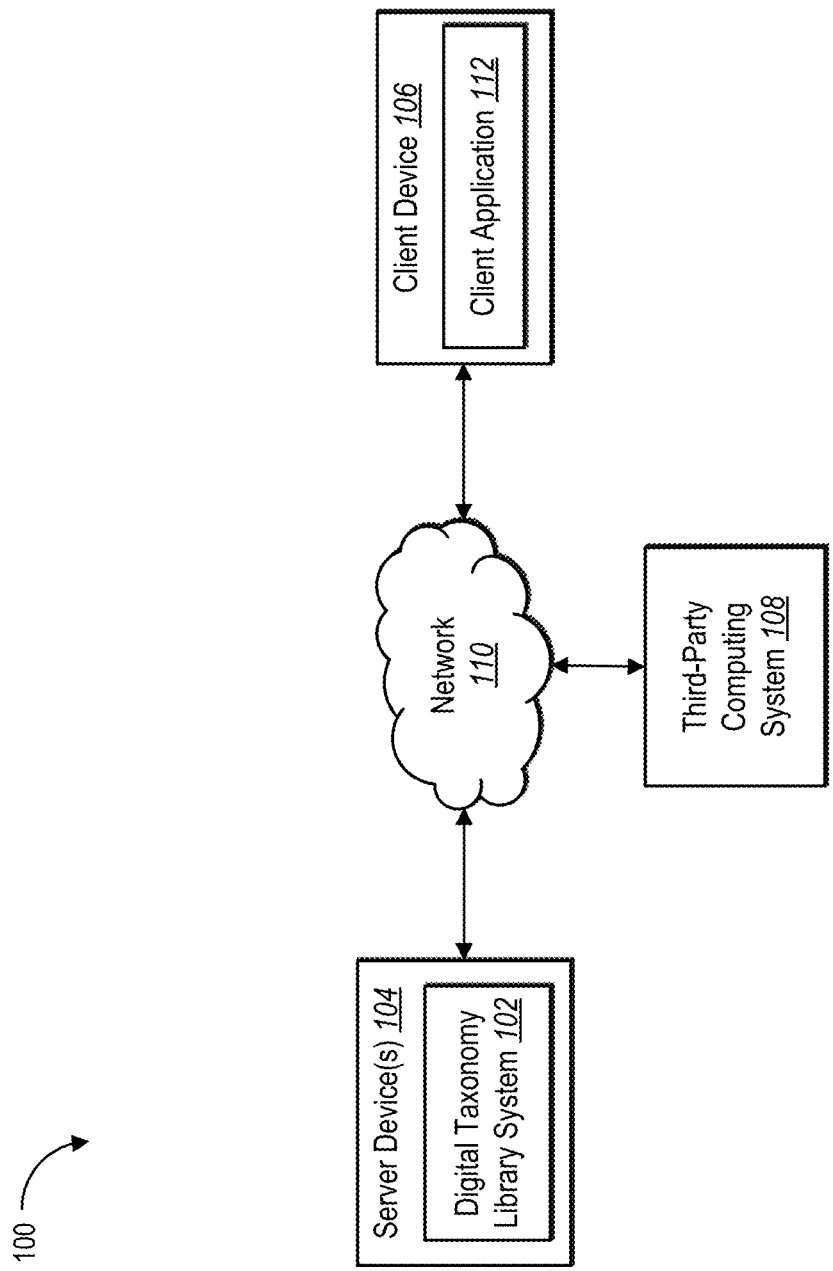
FIG. 1 illustrates an example of a system environment in which a digital taxonomy library system can operate in accordance with one or more embodiments.

This disclosure describes one or more embodiments of a digital taxonomy library system that provides a library that builds and manages graph-based taxonomies for data processes within and across various domains associated with an entity. In particular, in response to inputs utilizing tools of the library, the digital taxonomy library system generates data objects representing one or more domains, categories, and sub-categories associated with one or more data processes according to an indicated taxonomy structure. Furthermore, the digital taxonomy library system utilizes inputs with the library tools to assign attributes to various nodes within a graph-based taxonomy by generating additional data objects representing the attributes and linking the attributes to various nodes according to the hierarchy of the taxonomy. By leveraging the structure and hierarchy of the taxonomy and the corresponding data objects, the digital taxonomy library system provides tools to calculate attribute values at various nodes of the taxonomy (e.g., utilizing one or more aggregation operations). Accordingly, the digital taxonomy library system can determine impacts of various components of the taxonomy on other components of the taxonomy based on the connections between the various data objects.

As mentioned, in one or more aspects, the digital taxonomy library system generates a graph-based taxonomy according to a plurality of node data objects representing a domain and categories in the domain. For instance, the digital taxonomy library system generates and provides a digital software library including a plurality of components for generating, modifying, and otherwise maintaining the graph-based taxonomy in connection with one or more domains. Specifically, the digital taxonomy library system provides a library of tools within a graphical user interface to define specific nodes within the graph-based taxonomy in accordance with one or more data processes associated with various computing environments (e.g., one or more software clouds servicing one or more domains). Additionally, the digital taxonomy library system provides the library of tools to define relationships between the nodes, such as by defining a taxonomy hierarchy indicating parent/child relationships of various nodes via representative node data objects according to user inputs via the tools.

In one or more aspects, the digital taxonomy library system assigns one or more attributes to various nodes in the graph-based taxonomy in response to inputs utilizing the library of tools. For example, the digital taxonomy library system provides tools for assigning a selected attribute to a given node within the graph-based taxonomy. The digital taxonomy library system utilizes hierarchy data (e.g., parent/child sets) stored in data objects corresponding to the nodes of the graph-based taxonomy to automatically propagate attribute information through the graph-based taxonomy. Accordingly, the digital taxonomy library system generates an attribute data object for the attribute and links the attribute data object to specific node data objects according to the hierarchy.

Furthermore, the digital taxonomy library system generates attribute metadata for data objects associated with the graph-based taxonomy to generate aggregated attribute information for a particular attribute. To illustrate, the digital taxonomy library system determines an aggregation operation (e.g., specific computing operations or logic) to aggregate attribute values for a given attribute according to node data objects linked to the attribute data object. Additionally, the digital taxonomy library system aggregates the attribute values according to the selected aggregation operation and the hierarchy data associated with the node data objects.

In some aspects, the digital taxonomy library system provides information associated with attribute values of the graph-based taxonomy for display within a graphical user interface of a client device. Specifically, the digital taxonomy library system utilizes individual and aggregated attribute values associated with various nodes in a graph-based taxonomy to generate and provide notifications or other indications of data associated with an attribute according to the relationships between components of the graph-based taxonomy. Furthermore, in one or more aspects, the digital taxonomy library system generates the library to include various components that listen for events that cause changes to the data objects (e.g., node data objects and/or attribute data objects) and automatically update the data objects and corresponding data in the graph-based taxonomy. Thus, the digital taxonomy library system utilizes the library to provide user-facing tools to generate and modify a graph-based taxonomy while also providing back-end tools to automatically manage various aspects of the graph-based taxonomy and its underlying data objects according to changes in one or more computing environments associated with the graph-based taxonomy.

In some aspects, the digital taxonomy library system also leverages the library to implement changes within one or more computing environments based on a graph-based taxonomy. Some embodiments involve including a digital taxonomy library system as a component of a computing environment that includes software and/or hardware for implementing data processing in connection with communication, physical, and/or information security. For instance, the digital taxonomy library system can utilize a taxonomy library to determine when attributes of nodes in the graph-based taxonomy meet specific thresholds or otherwise provide indications that various controls associated with digital data requirements of a system requirements framework are not implemented or need to be implemented. In connection with automatically extracting such information based on the graph-based taxonomy (e.g., including individual or aggregated attribute values), the digital taxonomy library system can utilize a software and/or hardware integration with computing devices associated with a domain of the graph-based taxonomy to automatically implement the controls within the computing devices.

As an example, the digital taxonomy library system can utilize a software/hardware integration (e.g., via one or more API calls, database operations, or executables installed on the computing devices) to automatically apply a specific control on a specific dataset or data type according to a set of digital data requirements of a system requirements framework. To illustrate, the digital taxonomy library system executes computing instructions (or causes a computing device to execute instructions) to implement a control to apply a specific encryption type to a dataset in connection with aggregating attribute information with the graph-based taxonomy. In additional embodiments, the digital taxonomy library system provides tools for a user to implement such controls in connection with managing a graph-based taxonomy by generating, modifying, or deleting data in connection with providing aggregated attribute information associated with the graph-based taxonomy.

In one or more aspects, the digital taxonomy library system improves upon shortcomings of conventional systems in relation to managing data processes provided by computing systems. In contrast to conventional systems that provide siloed or individual management of different computing systems of an entity, the digital taxonomy library system provides a library of graphical user interface tools for flexible and efficient management of graph-based taxonomies for various computing software processes within and across different domains. In particular, the digital taxonomy library system provides tools for generating graph-based taxonomies representing aspects of different computing systems or environments, editing attributes of the individual nodes, and determining the effects of various nodes on other nodes within the graph-based taxonomies. By providing such tools, the digital taxonomy library system provides improved graphical user interfaces for managing and representing relationships of various domain entities and categories across different computing devices and systems associated with an entity via a customizable, interactive, and dynamic graph-based taxonomy.

Additionally, in some aspects, the digital taxonomy library system provides tools for efficiently determining the impacts of various attributes (e.g., risk measurements, computing resources of digital assets) of assets or components within and across different domains. Specifically, the digital taxonomy library system utilizes data objects to represent nodes and their corresponding attributes within a graph-based taxonomy. By generating separate digital data objects representing domains, categories, and sub-categories (and their corresponding attributes) within a graph-based taxonomy, the digital taxonomy library system can generate, modify, and automatically update attributes associated with the different components of the graph-based taxonomy. For example, as previously mentioned, the digital taxonomy library system utilizes a library including components for generating, modifying, or deleting nodes and attributes within a graph-based taxonomy while listening for additional events within one or more computing systems that impact the nodes or attributes. The digital taxonomy library system can thus automatically update the graph-based taxonomy by making modifications to the corresponding data objects in response to detecting various events.

Furthermore, the digital taxonomy library system utilizes a library that includes one or more components for notifying one or more computing devices based on changes to a graph-based taxonomy. For instance, the digital taxonomy library system can utilize the library to automatically generate and provide notifications to one or more computing devices indicating changes detected via one or more events. More specifically, the digital taxonomy library system can monitor changes within a graph-based taxonomy (e.g., to nodes corresponding to domain entities or attributes of the nodes) and provide real-time notifications of the changes to various computing devices.

In some examples, the digital taxonomy library system also provides user interface tools for implementing changes to one or more computing devices based on the real-time notifications (e.g., automatically or in response to user interactions with the user interface tools). In contrast to conventional systems that utilize information technology controls to implement access controls, the digital taxonomy library system utilizes a graph-based taxonomy to automatically detect issues with existing control implementations and mitigate or correct the issues based on real-time information. For example, the digital taxonomy library system can utilize the graph-based taxonomy to detect an unpatched server containing personally identifiable information, determine the impacts (e.g., security risks) of the unpatched server on one or more additional systems, and implement mitigation or additional controls to correct issues associated with the unpatched server. Thus, the digital taxonomy library system can also provide timely modification of computing systems based on detected changes (e.g., modified attributes) within the graph-based taxonomy or detected impacts of attributes across one or more categories or domains.

Turning now to the figures, FIG. 1 includes an embodiment of a system environment 100 in which a digital taxonomy library system 102 is implemented. In particular, the system environment 100 includes server device(s) 104, a client device 106, and a third-party computing system 108 in communication via a network 110. Moreover, as shown, the client device 106 includes a client application 112.

As shown in FIG. 1, in one or more embodiments, the server device(s) 104 include or host the digital taxonomy library system 102. Specifically, the digital taxonomy library system 102 includes, or is part of, one or more systems that utilize one or more data processes or other data processes to process digital data and/or provide other services associated with the third-party computing system 108. For example, the digital taxonomy library system 102 (or another system) provides tools to the client device 106 for managing data associated with an entity for performing various data processes for the entity. In at least some aspects, the digital taxonomy library system 102 provides tools to the client device 106 via the client application 112 for viewing and managing information associated with data that the entity handles, including data stored at one or more digital data repositories of the third-party computing system 108. In one or more embodiments, the digital taxonomy library system 102 installs or communicates with software at the client device (e.g., via the client application 112) and/or at the third-party computing system 108 to extract data and perform one or more data processes on the data in connection with managing controls related to one or more system requirements frameworks.

As used herein, the term "system requirements framework" refers to an established set of data requirements related to a regulations enforceable by a governing body such as a government, professional body, or other entity that enacts the regulations. To illustrate, system requirements frameworks associated with regulations include, for example, a set of digital data requirements for handling specific types of data in connection with practices established by the International Organization for Standardization ("ISO"), internally by a particular organization (e.g., a multinational corporation), or a territory government (e.g., the European Union). The digital taxonomy library system 102 (or another system) thus provides tools to manage the use, environment, or other attributes associated with functions or infrastructure handling specific data types and/or using machine-learning models in connection with a particular system requirements framework.

As used herein, the term "control" refers to a tool or function for satisfying a digital data requirement of a system requirements framework for a computing environment. An example of a control is a procedure or practice for storing, redacting, encrypting, transferring, or otherwise handling a specific data type in a computing environment that entities are required to follow in connection with a regulation governing security or privacy. For instance, a control can include requirements for handling personally identifiable information, financial information, medical information, legal information, or other data types in computing devices or transmissions between computing devices.

Furthermore, in one or more aspects, a control action includes an action to install a particular control for handling specific data types. To illustrate, control actions can include actions for redacting specific data types from digital documents, encrypting specific data types, grouping specific data types, excluding specific data types from communications, etc. Control actions can also include actions for modifying environments associated with digital documents, including implementing specific database operations for computing devices that handle data types, monitoring physical environments, installing environmental protections, restricting or reviewing access authorization to physical data centers, installing physical security controls, implementing specific security or privacy rules within an organization, etc.

In one or more embodiments, the digital taxonomy library system 102 manages database, contents of databases, computing devices, or other components of an environment in which an entity handles specific data types covered by a particular system requirements framework via the use of data objects. As used herein, the term "data object" refers to a digital object for tracking and storing information associated with managing systems, software, data sources, entities, or other functions or infrastructure involved in handling specified data for an entity. For example, a data object can include a digital representation of the entity itself, a sub-entity such as subsidiary of the entity, a business unit of the entity, a data asset, a project, a dataset, digital documents in a dataset, a computing operation such as a data process, or a node or attribute of a graph-based taxonomy. Data objects can include node data objects representing nodes in a graph-based taxonomy or attribute data objects representing attributes of nodes in the graph-based taxonomy. Additionally, in some embodiments, the digital taxonomy library system 102 utilizes different types of data objects to represent different types of components, such as a data asset object representing a data asset (e.g., hardware device or cluster of devices, a software application, a website), a dataset object to represent a dataset, a document object to represent a digital document, a filter object representing a probabilistic data structure, etc. In additional embodiments, data objects include, but are not limited to, control objects representing controls for system requirements frameworks, evidence objects representing evidence tasks for collecting evidence of implemented controls, or data assets (e.g., computing components) on which data processes operate.

Additionally, as used herein, the term "data process" refers to a computing process that performs one or more actions associated with specified data. In some embodiments, a data process is represented by a data object (e.g., a data process object). For example, the digital taxonomy library system 102 generates/stores a data object representing a data process including, but not limited to, a computing process or action corresponding to execution of processing instructions (e.g., by utilizing a database operation) to process, collect, access, store, retrieve, modify, or delete target data. To illustrate, for target data including credit card information and payment information associated with processing a credit card transaction, the digital taxonomy library system 102 generates a data object to represent a data process that collects the credit card information through a form (e.g., webpage) provided via the website and processes the credit card information with the appropriate card provider to process the credit card transaction.

As mentioned, the digital taxonomy library system 102 also provides tools for generating graph-based taxonomies using data objects to represent nodes and their attributes within the graph-based taxonomies. To illustrate, the digital taxonomy library system 102 generates a graph-based taxonomy by generating a visual representation of relationships between a domain and various categories by linking corresponding data objects together. Additionally, because data objects can represent additional components associated with data processes, the digital taxonomy library system 102 can link nodes in a graph-based taxonomy to data assets, certain types of data, controls, or other components associated with data processes for use in determining whether functions or infrastructure represented by the data objects are in compliance with specific requirements/controls of a system requirements framework.

According to one or more embodiments, the digital taxonomy library system 102 manages data objects by communicating with the client device 106 and/or the third-party computing system 108. Specifically, the digital taxonomy library system 102 can communicate with the client device 106 and/or the third-party computing system 108 to generate data objects representing data and/or to determine or otherwise obtain information associated with the data objects. The digital taxonomy library system 102 may be configured to communicate with the client device 106 and/or the third-party computing system 108 on behalf of the entity via an integration that is configured with the entity's credentials (e.g., via an integrated data extraction software application). The digital taxonomy library system 102 can obtain metadata or other information about the infrastructure or functions used by the entity and thereby populate attributes of the data objects with this information.

In additional embodiments, the digital taxonomy library system 102 communicates with the client device 106 to obtain information associated with the data objects or to provide information about the data objects for display within the client application 112. For instance, the digital taxonomy library system 102 can obtain, via user input received from an administrator client device, metadata or other information about the infrastructure or functions used by the entity and thereby populate attributes of the data objects with this information. Furthermore, the digital taxonomy library system 102 can receive inputs from the client device 106 to generate or modify a graph-based taxonomy and/or perform operations at one or more computing systems associated with the graph-based taxonomy.

In one or more embodiments, the third-party computing system 108 includes a server device, an individual client device, or another computing device associated with an entity. For instance, the third-party computing system 108 includes one or more computing devices for performing a data process involving handling data associated with one or more operations of the entity subject to a particular system requirements framework. To illustrate, the third-party computing system includes one or more server devices that generate, process, store, or transmit payment card processing data subject to PCI DSS in one or more jurisdictions and are therefore covered by one or more corresponding system requirements frameworks.

In one or more embodiments, the server device(s) 104 include a variety of computing devices, including those described below with reference to FIG. 17. For example, the server device(s) 104 includes one or more servers for storing and processing data associated with one or more data processes. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In one or more embodiments, the client device 106 includes, but is not limited to, a desktop, a mobile device (e.g., smartphone or tablet), or a laptop including those explained below with reference to FIG. 17. Furthermore, although not shown in FIG. 1, the client device 106 can be operated by users (e.g., a user included in, or associated with, the system environment 100) to perform a variety of functions. In particular, the client device 106 performs functions such as, but not limited to, accessing, viewing, and interacting with data associated with data processes associated with one or more system requirements frameworks. In some embodiments, the client device 106 also performs functions for generating, capturing, or accessing data to provide to the digital taxonomy library system 102 in connection with managing a graph-based taxonomy and/or data processes. For example, the client device 106 communicates with the server device(s) 104 via the network 110 to provide information (e.g., user interactions) associated with a graph-based taxonomy. Although FIG. 1 illustrates the system environment 100 with a single client device, in some embodiments, the system environment 100 includes a plurality of client devices.

Additionally, as shown in FIG. 1, the system environment 100 includes the network 110. The network 110 enables communication between components of the system environment 100. In one or more embodiments, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the client device 106, and the third-party system communicate via the network using one or more communication platforms and technologies suitable for transporting data and/or communication signals, including any known communication technologies, devices, media, and protocols supportive of data communications, examples of which are described with reference to FIG. 17.

Although FIG. 1 illustrates the server device(s) 104, the client device 106, and the third-party computing system 108 communicating via the network 110, in alternative embodiments, the various components of the system environment 100 communicate and/or interact via other methods (e.g., the server device(s) 104, the client device 106, and/or the third-party computing system 108 can communicate directly). Furthermore, in some embodiments, the digital taxonomy library system 102 accesses or includes a digital data repository associated with the third-party computing system 108 to access data associated with a graph-based taxonomy and/or data processes corresponding to a graph-based taxonomy. Accordingly, the server device(s) 104, the third-party computing system 108, the client device 106, or another device includes the digital data repository.

In some embodiments, the server device(s) 104 support the digital taxonomy library system 102 on the client device 106. For instance, the server device(s) 104 generates/maintains the digital taxonomy library system 102 and/or one or more components of the digital taxonomy library system 102 for the client device 106. The server device(s) 104 provides the digital taxonomy library system 102 to the client device 106 (e.g., as part of a software application/suite). In other words, the client device 106 obtains (e.g., downloads) the digital taxonomy library system 102 from the server device(s) 104. At this point, the client device 106 is able to utilize the digital taxonomy library system 102 to manage compliance of data processes according to one or more system requirements frameworks and/or manage graph-based taxonomies independently from the server device(s) 104.

In alternative embodiments, the digital taxonomy library system 102 includes a web hosting application that allows the client device 106 to interact with content and data processes hosted on the server device(s) 104. To illustrate, in one or more embodiments, the client device 106 accesses a web page supported by the server device(s) 104. The client device 106 provides input to the server device(s) 104 to perform graph-based taxonomy or compliance management operations, and in response, the digital taxonomy library system 102 on the server device(s) 104 performs operations to view/manage data associated with graph-based taxonomy. The server device(s) 104 provide the output or results of the operations to the client device 106.

Figure 2:
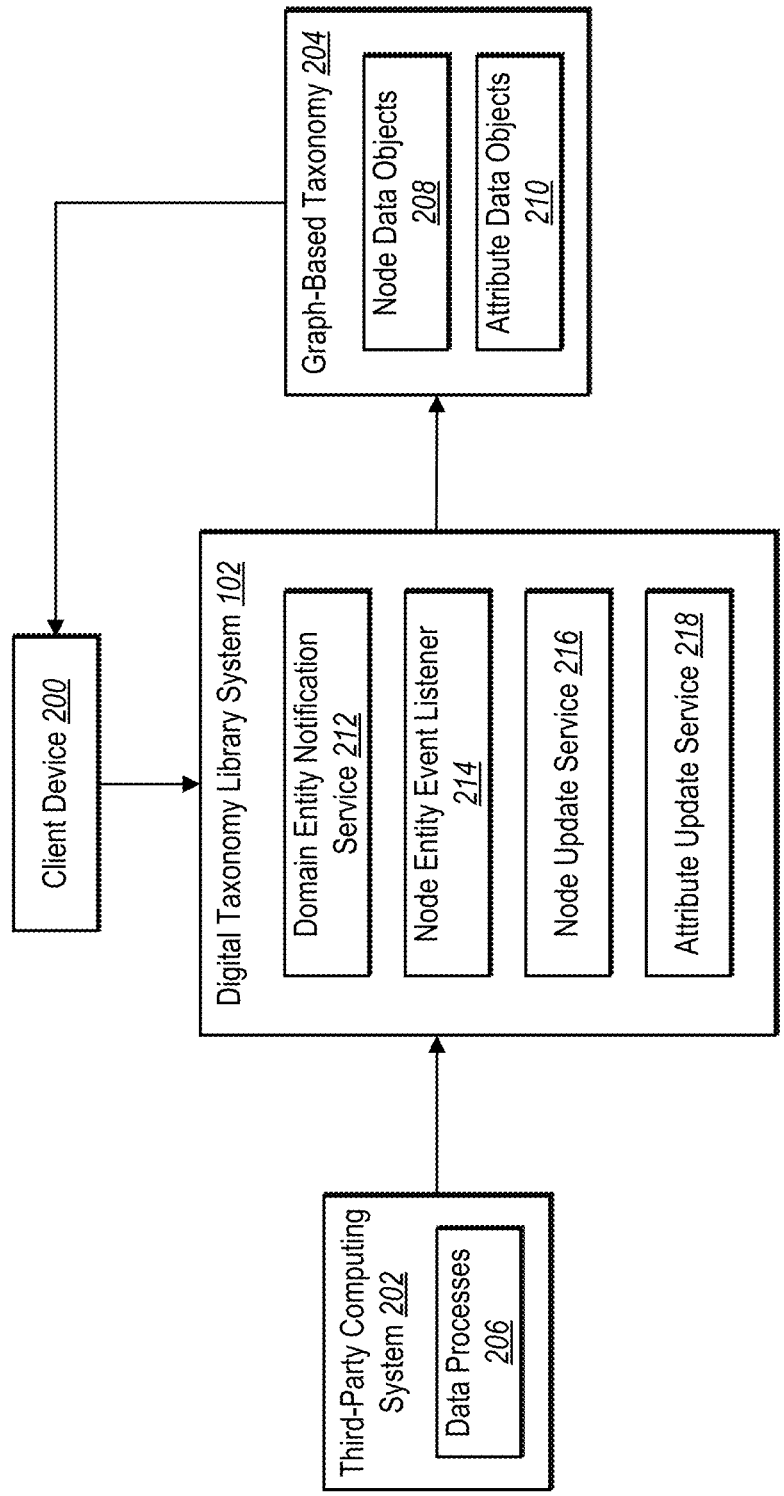
FIG. 2 illustrates an example of an overview of the digital taxonomy library system generating a graph-based taxonomy for a data process in accordance with one or more embodiments.

As mentioned, the digital taxonomy library system 102 provides tools for generating and managing a graph-based taxonomy corresponding to data processes of various computing environments. FIG. 2 illustrates the digital taxonomy library system 102 communicating with various systems/devices to generate a graph-based taxonomy according to one or more data processes associated with an entity. In particular, FIG. 2 illustrates that the digital taxonomy library system 102 includes a plurality of components for communicating with the systems/devices to generate, manage, and update a graph-based taxonomy in connection with the one or more data processes.

In one or more aspects, the digital taxonomy library system 102 is in communication with a client device 200 and a third-party computing system 202 to generate a graph-based taxonomy 204. In particular, as previously mentioned, the digital taxonomy library system 102 utilizes one or more inputs from the client device 200 to generate the graph-based taxonomy 204 including a plurality of nodes connected according to a taxonomy hierarchy. For instance, as illustrated in FIG. 2, the digital taxonomy library system 102 utilizes inputs provided by the client device 200 to generate the graph-based taxonomy 204 according to data processes 206 at the third-party computing system 202. To illustrate, the digital taxonomy library system 102 can generate the graph-based taxonomy 204 to represent relationships between different one or more domains, categories, and/or sub-categories associated with the data processes 206.

According to one or more aspects, the digital taxonomy library system 102 generates the graph-based taxonomy 204 by representing information within the graph-based taxonomy 204 to a plurality of data objects. Specifically, the digital taxonomy library system 102 generates node data objects 208 representing nodes in the graph-based taxonomy 204. The digital taxonomy library system 102 also generates attribute data objects 210 representing attributes of various nodes in the graph-based taxonomy 204. The digital taxonomy library system 102 thus generates the graph-based taxonomy 204 by generating and linking the node data objects 208 and the attribute data objects 210 according to the taxonomy hierarchy.

In one or more embodiments, the digital taxonomy library system 102 includes a plurality of components that facilitate the generation and maintenance of the graph-based taxonomy 204. For example, the digital taxonomy library system 102 includes a node update service 212 to add, remove, or modify nodes within the graph-based taxonomy 204. To illustrate, the digital taxonomy library system 102 utilizes the node update service 212 to communicate with the client device 200 to receive inputs indicating the contents of nodes within the graph-based taxonomy 204 and relationships between the nodes. The digital taxonomy library system 102 thus utilizes the node update service 212 to generate the graph-based taxonomy 204 by generating the node data objects 208 including information indicating relationships among the node data objects 208.

Furthermore, digital taxonomy library system 102 includes a node entity event listener 214 to listen for node update events related to the node data objects 208. In particular, the digital taxonomy library system 102 utilizes the node entity event listener 214 to listen for events at the third-party computing system 202 (e.g., in connection with the data processes 206) or the client device 200 corresponding to one or more of the node data objects 208. For example, the digital taxonomy library system 102 utilizes the node entity event listener 214 to detect changes to relationships associated with a given node data object, changes to a position of a node data object within the taxonomy hierarchy, changes to attributes of various node data objects, changes to a domain or category associated with one or more node data objects in the graph-based taxonomy 204, or other changes that impact the structure of the graph-based taxonomy 204 or the information associated with one or more node data objects.

In one or more embodiments, the digital taxonomy library system 102 includes a domain entity notification service 216 for generating notifications associated with changes to the graph-based taxonomy 204. For instance, the digital taxonomy library system 102 can utilize the domain entity notification service 216 to determine one or more changes to one or more data objects of the graph-based taxonomy 204 (e.g., by communicating with one or more other services). The digital taxonomy library system 102 can also utilize the domain entity notification service 216 to generate a notification to provide to one or more client devices indicating the changes to the graph-based taxonomy 204. In some aspects, the digital taxonomy library system 102 utilizes the domain entity notification service 216 to generate options (e.g., within a notification) to perform one or more computing operations associated with the changes.

In some embodiments, the digital taxonomy library system 102 includes an attribute update service 218 to add, remove, or modify attributes of nodes within the graph-based taxonomy 204. To illustrate, the digital taxonomy library system 102 utilizes the attribute update service 218 to communicate with the client device 200 to receive inputs indicating attributes and/or attribute values within the graph-based taxonomy 204. For instance, the digital taxonomy library system 102 utilizes the attribute update service 218 to assign attributes to specific node data objects or groups of node data objects (e.g., corresponding to measurement nodes) and/or to assign attribute values to the node data objects. The digital taxonomy library system 102 thus utilizes the node update service 212 to generate the graph-based taxonomy 204 by generating the attribute data objects 210 including information indicating attributes associated with one or more nodes and to determine attribute aggregation operations.

Figure 3:
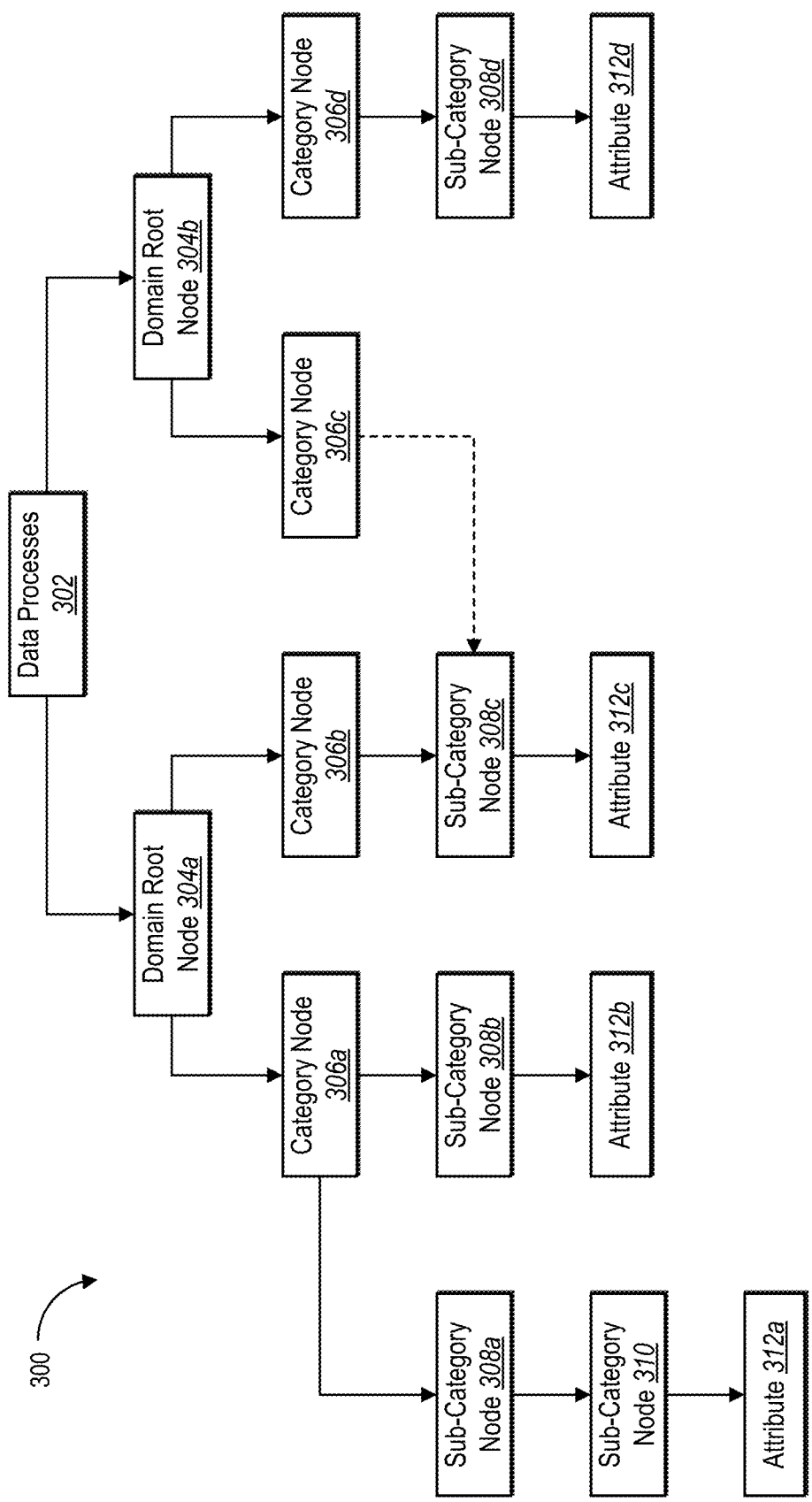
FIG. 3 illustrates an example of a graph-based taxonomy for a domain including nodes and attributes represented by data objects in accordance with one or more embodiments.

FIG. 3 illustrates an example of a graph-based taxonomy 300 associated with a data process 302. In particular, the digital taxonomy library system 102 generates the graph-based taxonomy 300 to include a plurality of nodes representing one or more domains and/or categories of the domains associated with the data process 302. As an example, the data process 302 includes a data process executed by a software application or application suite (e.g., an enterprise software suite), a data process within a specific hardware environment, a data process performed by (or in connection with) a particular department of an entity, or a data process corresponding to a particular risk (e.g., an enterprise risk).

Additionally, the digital taxonomy library system 102 generates one or more nodes (e.g., via node data objects) representing domains associated with the data process 302. For example, the digital taxonomy library system 102 generates a first domain root node 304a corresponding to a first domain of the data process 302 and a second domain root node 304b corresponding to a second domain of the data process 302. To illustrate, the digital taxonomy library system 102 determines that the data process 302 includes a plurality of separate aspects of a single data process (e.g., different software applications in a suite or different types of risk domains corresponding to a specific software application). As an example, the digital taxonomy library system 102 generates domain root nodes for different risk domains (e.g., operational risk, ESG risk, strategic risk, informational technology risk) associated with the data process 302.

In one or more embodiments, the digital taxonomy library system 102 also determines a plurality of categories and/or sub-categories of one or more domains of the data process 302. In particular, as illustrated in FIG. 3, the digital taxonomy library system 102 generates a plurality of category nodes 306a-306d corresponding to the domains of the data process 302. Accordingly, the digital taxonomy library system 102 generates a category node corresponding to a particular category of a domain by generating a corresponding node data object and linking the node data object to a node data object of the corresponding domain root node. To illustrate, the digital taxonomy library system 102 generates a first category node 306a and connects the first category node 306a to the first domain root node 304a via information stored within the corresponding node data objects. As an example, a category node corresponds to a particular set of tools, clusters of data assets, or sets of operations corresponding to a given software application or to a specific type of risk in a risk domain.

In additional aspects, as illustrated, the digital taxonomy library system 102 generates sub-category nodes 308a-308d to connect to the one or more of the category nodes 306a-306d. For example, FIG. 3 illustrates that the digital taxonomy library system 102 generates the graph-based taxonomy 300 to include a first sub-category node 308a and a second sub-category node 308b representing different sub-categories of a category corresponding to the first category node 306a. To illustrate, the digital taxonomy library system 102 can generate sub-category nodes to represent specific functions of an application, specific data assets within asset clusters, or other sub-categories within the corresponding domains. In some embodiments, the digital taxonomy library system 102 also generates one or more sub-category nodes that include child relationships of one or more other sub-category nodes, as indicated by an additional sub-category node 310 in FIG. 3.

In one or more embodiments, the digital taxonomy library system 102 generates node data objects with relationships to more than one parent node data object. To illustrate, a third sub-category node 308c has a child relationship to more than one category node (e.g., the second category node 306b and a third category node 306c. In some aspects, the digital taxonomy library system 102 assigns a priority to the parent relationships of nodes with more than one parent node. For example, the digital taxonomy library system 102 determines that a parent relationship of the second category node 306b to the third sub-category node 308c has a higher priority than a parent relationship of the third category node 306c to the third sub-category node 308c. The digital taxonomy library system 102 can utilize the relationship priorities when constructing a visual representation of the graph-based taxonomy 300 (e.g., via solid or dashed lines) and/or in connection with aggregating attribute values, as described in more detail below.

According to one or more embodiments, the digital taxonomy library system 102 generates the graph-based taxonomy 300 including one or more attributes tied to one or more nodes. For instance, FIG. 3 illustrates that the digital taxonomy library system 102 links attributes 312a-312d to a plurality of nodes. To illustrate, in response to inputs via one or more client devices, the digital taxonomy library system 102 links the attributes 312a-312d to selected node, which can involve the digital taxonomy library system 102 generating one or more attribute data objects (e.g., for one or more attributes) and linking the attribute data object(s) of the attribute(s) to corresponding node data objects. In one or more examples, an attribute includes a specific measurement associated with one or more nodes, such as a risk measurement (e.g., annualized loss expectancy, single loss expectancy, annualized rate of occurrence), a processing measurement (e.g., CPU usage), or other measurement type associated with a particular data process.

Figure 4:
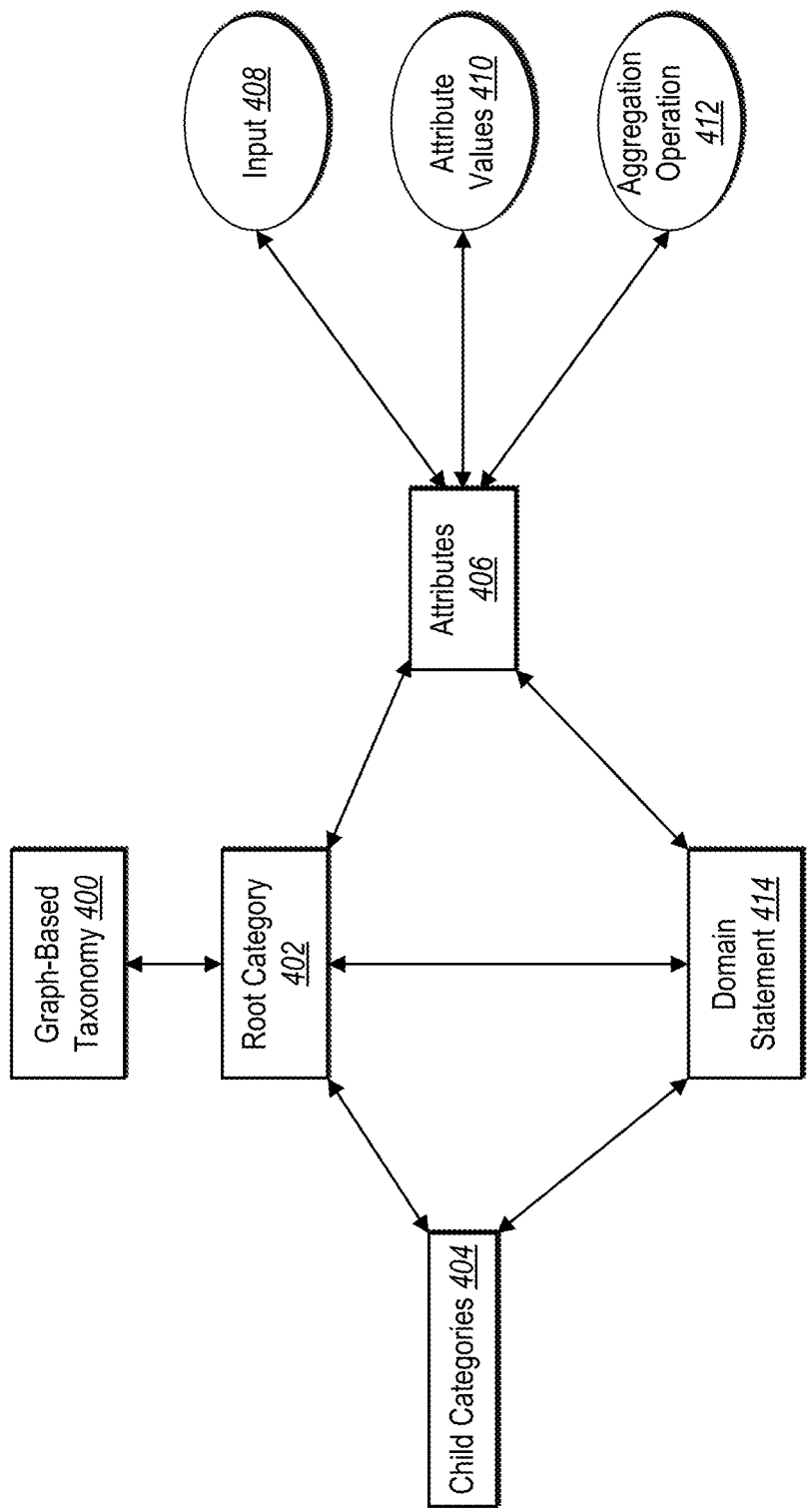
FIG. 4 illustrates an example of the digital taxonomy library system generating a graph-based taxonomy according to a taxonomy hierarchy and attributes assigned to various portions of the graph-based taxonomy in accordance with one or more embodiments.

In one or more aspects, as mentioned, the digital taxonomy library system 102 utilizes inputs from one or more client devices to generate and maintain a graph-based taxonomy. FIG. 4 illustrates that the digital taxonomy library system 102 generates the graph-based taxonomy 400 by linking nodes to link various aspects of a data process. Specifically, FIG. 4 illustrates that the digital taxonomy library system 102 generates a graph-based taxonomy 400 by defining a hierarchy including various nodes and attributes to link one or more domain entities (e.g., domain, category, sub-category) to nodes and attributes within the graph-based taxonomy.

To illustrate, the digital taxonomy library system 102 generates the graph-based taxonomy 400 by determining a root category 402 associated with a particular domain. More specifically, as previously noted, the digital taxonomy library system 102 determines a domain associated with a data process and generates the root category 402 based on the position of the root category 402 within a hierarchy of the graph-based taxonomy 400. Furthermore, the digital taxonomy library system 102 generates child categories 404 corresponding to categories of the domain based on positions of the child categories 404 relative to the root category 402 within the hierarchy of the graph-based taxonomy 400.

In one or more aspects, the digital taxonomy library system 102 determines attributes 406 to assign to the root category 402 (or to the child categories 404). For example, in response to receiving inputs 408 from one or more client devices interacting with a graphical representation of the graph-based taxonomy 400, the digital taxonomy library system 102 determines the attributes 406 and the nodes associated with the attributes 406. Additionally, in one or more embodiments, the digital taxonomy library system 102 causes the child categories 404 to inherit attributes of the root category 402, or vice-versa, in response to the inputs 408.

Furthermore, in some embodiments, the digital taxonomy library system 102 determines attribute values 410 associated with the attributes 406 in connection with the inputs 408 or other data accessed by the digital taxonomy library system 102. Specifically, the digital taxonomy library system 102 can assign a particular attribute to a given node or set of nodes by linking a node data object of the node to an attribute data object. The digital taxonomy library system 102 can also determine a specific attribute value for a particular node in connection with the attribute based on an indication of the attribute value by an input or in response to extracting the attribute value from one or more computing devices. Thus, a plurality of different nodes in the graph-based taxonomy 400 associated with a particular attribute can have different attribute values.

In additional embodiments, the digital taxonomy library system 102 determines an aggregation operation 412 associated with the attributes 406. For instance, the digital taxonomy library system 102 determines an impact of attributes of nodes on other nodes/portions within the graph-based taxonomy 400 via the aggregation operation 412. To illustrate, the digital taxonomy library system 102 can determine how to combine the attribute values 410 according to the taxonomy hierarchy (e.g., relationships of root category 402 and child categories 404) utilizing the aggregation operation 412. According to one or more aspects, the aggregation operation 412 includes computational logic, instructions, or operations that combine the attribute values 410 based on the associations of the attributes 406 with specific nodes and the taxonomy hierarchy.

In some embodiments, the digital taxonomy library system 102 generates the graph-based taxonomy 400 based on a domain statement 414 associated with a particular domain. In particular, a domain statement can correspond to a domain that independently exist in (or corresponds to) a plurality of different areas of an entity. Accordingly, by tying the domain statement 414 to the graph-based taxonomy 400, the digital taxonomy library system 102 can utilize the attributes 406 of the specific nodes to determine an overall impact of the attributes 406 on the different areas of the entity and the entity as a whole.

As an example, an entity may include different areas (e.g., different computing systems) that all have a specific risk for "data breaches resulting from unencrypted data," which impacts each of the areas in different ways. Additionally, each separate computing system may need different controls to address this risk, such as encrypting data as it is generated, encrypting data as it is received, encrypting data twice, etc. However, when monitored at an entity-wide level, an aggregation of attribute values associated with the risk provides the ability to determine the impact of the risk on the entity as a whole, which can also require or allow for additional controls at the entity-wide level. Thus, the digital taxonomy library system 102 provides the graph-based taxonomy 400 with functionality to auto-fill attributes corresponding to the domain statement 414 that links domains across different areas of the entity while also aggregating the attribute values for the entity as a whole.

Furthermore, by generating a taxonomy hierarchy including one or more root categories and a plurality of child categories corresponding to various domains and their respective categories, the digital taxonomy library system 102 provides a number of different options for aggregating information about attributes of nodes corresponding to various domains and data processes. To illustrate, the digital taxonomy library system 102 provides tools for accessing and quantifying the attributes with varying levels of granularity. Additionally, the digital taxonomy library system 102 provides tools for determining whether to determine the impact of attribute values for any given attribute from the top down or from the bottom up. For example, in a top-down structure, a computing system of an entity can define important domains and attributes associated with the entity, collect data related to the domains/attributes from a plurality of different computing devices associated with the entity, and determine the impact of the attributes on the different domains and the entity as a whole. Alternatively, in a bottom-up structure, a plurality of different computing systems can generate and log attributes and their impacts on the individual computing systems and then aggregate the impacts of the attributes upstream via the graph-based taxonomy for assessing the impacts of each attribute across domains.

Figure 5:
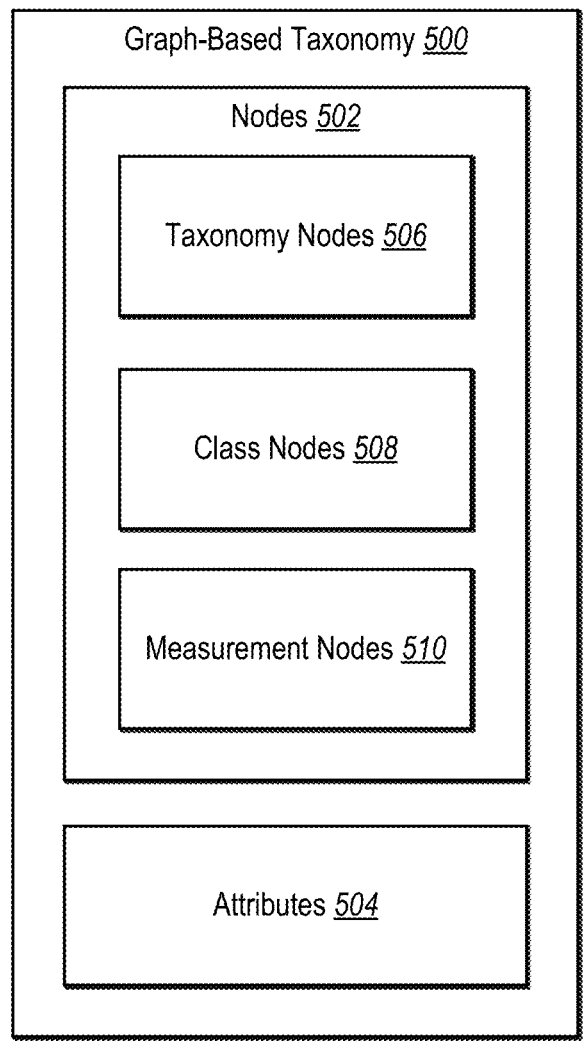
FIG. 5 illustrates an example of a graph-based taxonomy including a variety of nodes and attributes in accordance with one or more embodiments.

FIG. 5 illustrates an example of a graph-based taxonomy 500 including nodes 502 and attributes 504. In one or more embodiments, the digital taxonomy library system 102 generates a graph-based taxonomy to include a variety of different nodes. For example, the digital taxonomy library system 102 generates taxonomy nodes 506 indicating a specific taxonomy or data process. The digital taxonomy library system 102 can generate class nodes 508 representing domains and/or categories within the domains tied to the taxonomy or data process. Additionally, the digital taxonomy library system 102 can generate measurement nodes 510 representing specific types of measurements (e.g., attributes/attribute values) corresponding to the domains and categories.

In some aspects, the digital taxonomy library system 102 generates the different types of nodes via the specific relationships between data objects of the graph-based taxonomy 300 without including information specifically classifying the type of node. Rather, the digital taxonomy library system 102 indicates taxonomy nodes 506 and class nodes 508 based on their respective positions in the graph-based taxonomy 300. For example, the digital taxonomy library system 102 can generate the graph-based taxonomy 500 to include a taxonomy node at the top of a taxonomy hierarchy (e.g., with no parent nodes). The digital taxonomy library system 102 can generate class nodes (e.g., one or more domains) as child nodes to the taxonomy node and additional class nodes (e.g., one or more categories) as child nodes to the domains. More specifically, the digital taxonomy library system 102 defines the various nodes based on the relationships between respective node data objects and their positions within the taxonomy hierarchy.

Additionally, the digital taxonomy library system 102 can indicate measurement nodes by linking a node to a particular attribute of the attributes 504. For example, the digital taxonomy library system 102 indicates a measurement node by linking a node data object of the node to an attribute data object of a particular attribute. Furthermore, in some embodiments, the digital taxonomy library system 102 indicates a measurement node based on a position of the node within the taxonomy hierarchy or relationships of the node (e.g., a node at the bottom of the hierarchy or a node without any child nodes). Thus, the digital taxonomy library system 102 can indicate specific types of nodes without metadata explicitly indicating the node type. In alternative embodiments, the digital taxonomy library system 102 includes a node type field within each node data object for designating whether a node is a taxonomy node, a class node, or a measurement node.

Figure 6:
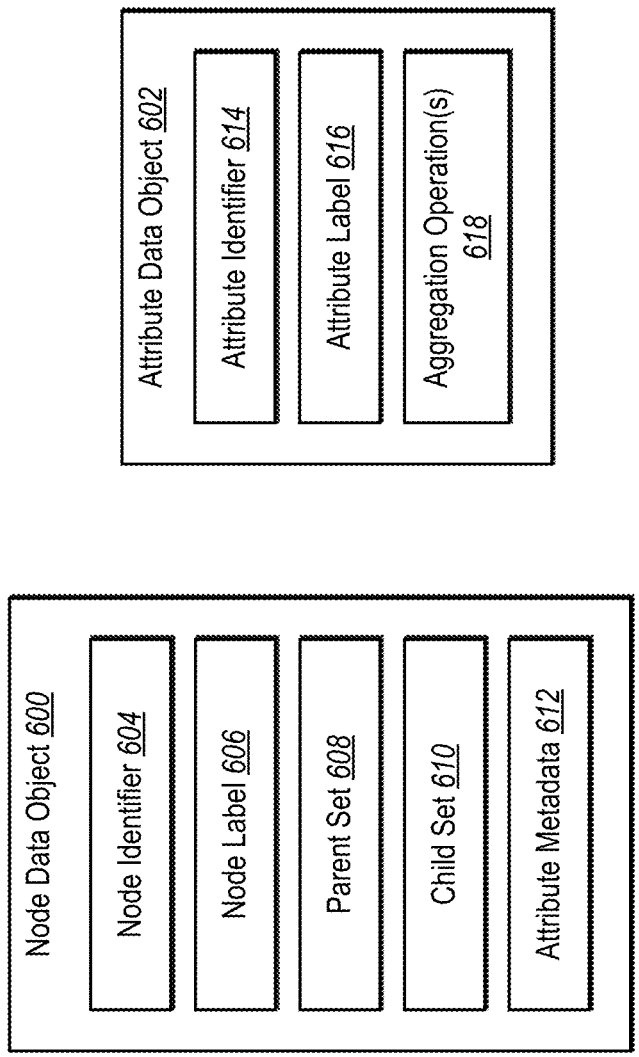
FIG. 6 illustrates examples of a node data object and an attribute data object in accordance with one or more embodiments.

FIG. 6 illustrates examples of data objects associated with a graph-based taxonomy. In particular, FIG. 6 illustrates a node data object 600 and an attribute data object 602. As illustrated, the digital taxonomy library system 102 generates each data object to indicate specific information associated with each node or attribute in the graph-based taxonomy. The digital taxonomy library system 102 also generates each data object to indicate relationships between different nodes and/or between nodes and specific attributes within the graph-based taxonomy.

In one or more aspects, the digital taxonomy library system 102 generates the node data object 600 to include a plurality of fields identifying a particular node and its relative position within a taxonomy hierarchy. For example, as illustrated in FIG. 6, the node data object 600 includes a node identifier 604 that uniquely identifies the node within the taxonomy hierarchy (e.g., via a universal unique identifier). The node data object 600 further includes a node label 606 that provides a user-facing label for the node for visually representing the node within a graphical user interface.

Additionally, as illustrated, the node data object 600 includes a parent set 608 and a child set 610. Specifically, the digital taxonomy library system 102 generates the parent set 608 and the child set 610 to indicate any relationships between the node data object 600 and one or more other node data objects. For example, the digital taxonomy library system 102 generates the parent set 608 as an array including identifiers of other node data objects that have a parent relationship to the node data object 600. In one or more examples, the parent set 608 can be empty indicating that the node of the node data object 600 is a taxonomy node (e.g., a root node), such that the node represents a taxonomy root category (e.g., a software application suite). In additional examples, if the parent set 608 identifies at least one node data object representing a taxonomy node (or a domain under a taxonomy node), the node data object 600 represents a class node corresponding to a domain or a category within a domain.

Furthermore, in one or more aspects, the parent set 608 of the node data object can include more than one parent node. Accordingly, the digital taxonomy library system 102 can thus indicate that the node data object 600 belongs to more than one graph-based taxonomy or to multiple domains/categories within a single taxonomy. The digital taxonomy library system 102 can thus provide tools for linking a single node across a plurality of domains and/or a plurality of taxonomies via the parent set of the corresponding node data object. Furthermore, for a measurement node, the digital taxonomy library system 102 can indicate that the measurement node belongs to more than one taxonomy or domain/category by including a plurality of node identifiers of node data objects in the parent set 608. As an example, the digital taxonomy library system 102 can tie a node representing a "data breach" category to more than one data asset category by including the node identifiers for the data asset categories in the parent set 608.

In additional aspects, the digital taxonomy library system 102 includes an array of node identifiers in the child set 610 to indicate that one or more nodes have a child relationship to the node of the node data object 600. For example, the digital taxonomy library system 102 can include one or more node identifiers in the child set of a taxonomy node or of a class node of the node data object 600 to indicate one or more class nodes and/or measurement nodes connected to the taxonomy/class node. In one or more embodiments, the digital taxonomy library system 102 indicates that the node data object 600 corresponds to a measurement node (e.g., a leaf node) by leaving the child set 610 empty.

In one or more embodiments, the digital taxonomy library system 102 links the node data object 600 representing the node to the attribute data object 602 representing an attribute. Specifically, the digital taxonomy library system 102 can generate the node data object 600 to include attribute metadata 612 that links the node data object 600 to one or more attribute data objects (e.g., including the attribute data object 602). For instance, the attribute metadata 612 includes an attribute identifier 614 of the attribute data object 602 to link the node data object 600 to the attribute data object 602. Furthermore, the attribute metadata 612 can include an aggregation operation identifier to specify the logic (e.g., aggregation operation) within the attribute data object 602 to use in aggregating attribute values for the node data object 600. In some aspects, the attribute metadata 612 also includes an input set identifying a source of input data for use with the identified aggregation operation and an output value corresponding to the aggregated attribute value for the attribute.

In one or more aspects, the attribute metadata 612 also includes a parent node identifier specifying a parent node from which a link to the attribute data object 602 was inherited according to the taxonomy hierarchy. In one or more embodiments, if the parent node identifier in the attribute metadata is null/blank, the digital taxonomy library system 102 can indicate that the attribute data object 602 is directly linked to the attribute data object 602, rather than inherited from a parent node. Thus, the digital taxonomy library system 102 can link an attribute to a node via a direct connection or via an inheritance from another node.

In some embodiments, the digital taxonomy library system 102 utilizes a library of tools to automatically update the attribute metadata 612 with inherited links to attribute data objects. For instance, in response to determining that a parent set of a first node is updated to identify a second node, the digital taxonomy library system 102 updates the attribute metadata of the first node to add any attribute data object links from the attribute metadata of the second node. Additionally, in some instances, the digital taxonomy library system 102 can also determine inheritances in various directions within a taxonomy hierarchy to include links to various attribute data objects to attribute metadata from parent nodes and/or child nodes.

As illustrated, the digital taxonomy library system 102 can generate the attribute data object 602 to include the attribute identifier 614 with a unique identifier of the attribute data object within a graph-based taxonomy. Furthermore, FIG. 6 illustrates that the attribute data object 602 includes an attribute label 616 that provides a user-facing identifier for the attribute data object 602 for display within a graphical user interface. In additional embodiments, the digital taxonomy library system 102 includes a set of aggregation operations 618 within the attribute data object 602 to indicate one or more available aggregation operations that can be used to apply to the attribute in connection with various nodes. To illustrate, the aggregation operations 618 can include selectable operations such as sum, max, mean, min, etc., from which the digital taxonomy library system 102 can select to use in aggregating attribute values according to various implementations. In response to a selection of a particular aggregation operation for use with the node data object 600, the digital taxonomy library system 102 can select the corresponding aggregation operation and include an identifier of the aggregation option in the attribute metadata 612 of the node data object 600.

Figure 7:
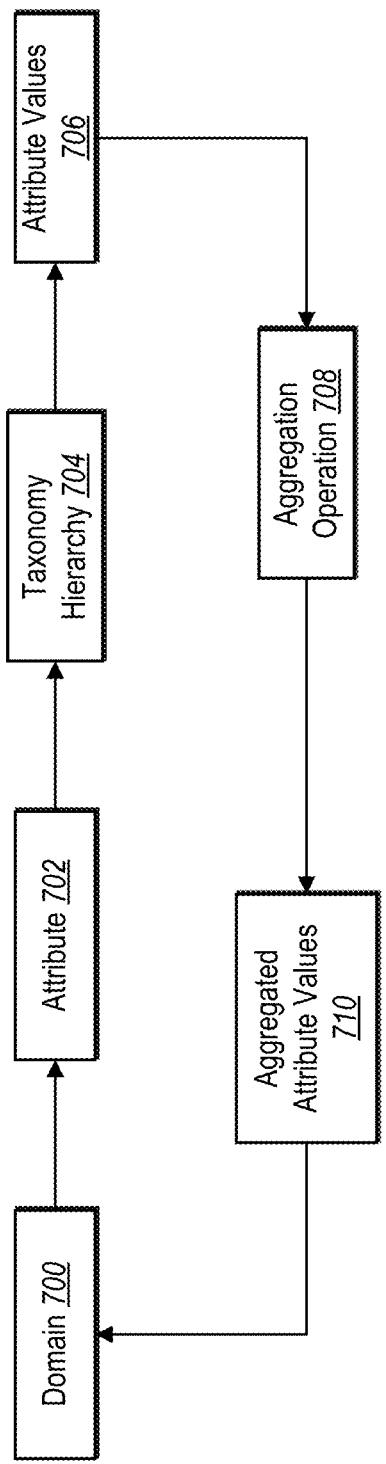
FIG. 7 illustrates an example of the digital taxonomy library system performing a process of generating a taxonomy hierarchy for a domain and determining and aggregating attribute values according to the taxonomy hierarchy in accordance with one or more embodiments.

FIG. 7 illustrates an example process for building a graph-based taxonomy for a particular data process and/or a domain associated with the data process. For example, in response to various inputs provided by one or more client devices via one or more graphical user interfaces, the digital taxonomy library system 102 generates the graph-based taxonomy to include a hierarchy of information and aggregation of corresponding attribute values. Thus, the digital taxonomy library system 102 can construct the graph-based taxonomy to indicate the impact of various attribute values throughout the graph-based taxonomy and/or across a plurality of graph-based taxonomies.

For example, the digital taxonomy library system 102 determines a domain 700 associated with a data process for constructing the graph-based taxonomy. To illustrate, the digital taxonomy library system 102 determines the domain 700 in connection with determine a plurality of domains associated with the data process. Additionally, the digital taxonomy library system 102 can also determine a plurality of categories and/or sub-categories associated with the domain 700.

In one or more embodiments, the digital taxonomy library system 102 also determines an attribute 702 to associate with the domain 700. For example, the digital taxonomy library system 102 can determine the attribute 702 for generating the graph-based taxonomy and determining the impact of the attribute 702 on the domain 700 and various categories. In connection with determining the attribute 702, the digital taxonomy library system 102 can also determine a taxonomy hierarchy 704 indicating the relationships between the domain and categories. Accordingly, the digital taxonomy library system 102 establishes nodes corresponding to the indicated domain 700 and categories for determining inheritance of the attribute 702 across various nodes.

In one or more embodiments, the digital taxonomy library system 102 determines attribute values 706 corresponding to the attribute 702 within the taxonomy hierarchy 704. In particular, the digital taxonomy library system 102 can determine measurement nodes of the graph-based taxonomy according to the relationships between nodes indicated via the taxonomy hierarchy 704. The digital taxonomy library system 102 can assign attribute values 706 to the measurement nodes for the attribute 702, such as in response to user inputs indicating the attribute values 706 or the digital taxonomy library system 102 extracting the attribute values 706 from one or more computing devices associated with the data process.

Furthermore, the digital taxonomy library system 102 can determine an aggregation operation 708 for use in determining the impacts of the attribute values 706 throughout the graph-based taxonomy according to the taxonomy hierarchy 704. For instance, as mentioned, the digital taxonomy library system 102 can determine the aggregation operation 708 that allows the digital taxonomy library system 102 to combine the attribute values 706 in one or more specified ways. Accordingly, the digital taxonomy library system 102 can utilize the aggregation operation 708 to generate aggregated attribute values 710 for the attribute 702 according to the nodes and corresponding relationships in the taxonomy hierarchy 704. The digital taxonomy library system 102 can thus determine the impact of the attribute 702 on the domain 700 (or in connection with one or more additional domains) via the aggregated attribute values 710.

FIGS. 8-15 provide graphical user interfaces for generating and managing graph-based taxonomies for various data processes involving one or more computing systems. For example, FIG. 8 illustrates a graphical user interface of a client device for managing information associated with a plurality of domains or domain categories. To illustrate, the client device displays a domain register 800 with a list of existing domains and/or domain categories for use in generating a graph-based taxonomy, along with various details associated with each defined domain/category. Specifically, the domain register 800 includes details such as a domain statement name, a description of the domain, one or more measurements, an organization or data process associated with the domain, a data source including information about the domain, one or more user accounts with ownership access to the domain entry, a type of domain, and/or controls associated with the domain.

FIG. 9 illustrates an example of a graphical user interface of a client device to add a new domain to the domain register 800 of FIG. 8. In some embodiments, the client device detects a selection to add a new domain to the domain register (e.g., via an add domain element 802 of FIG. 8) and displays a plurality of options for characteristics of the domain. For example, FIG. 9 illustrates that the client device displays a domain creation interface 900 with a plurality of options to populate the details of the domain within the domain register. To illustrate, the client device can display an option to create a new domain or select the domain in connection with an existing domain statement. Additionally, as illustrated, the client device can display the domain creation interface 900 with options to name the domain, indicate one or more inherent characteristics (e.g., an inherent risk level), a domain category, a domain owner, etc.

Figure 10:
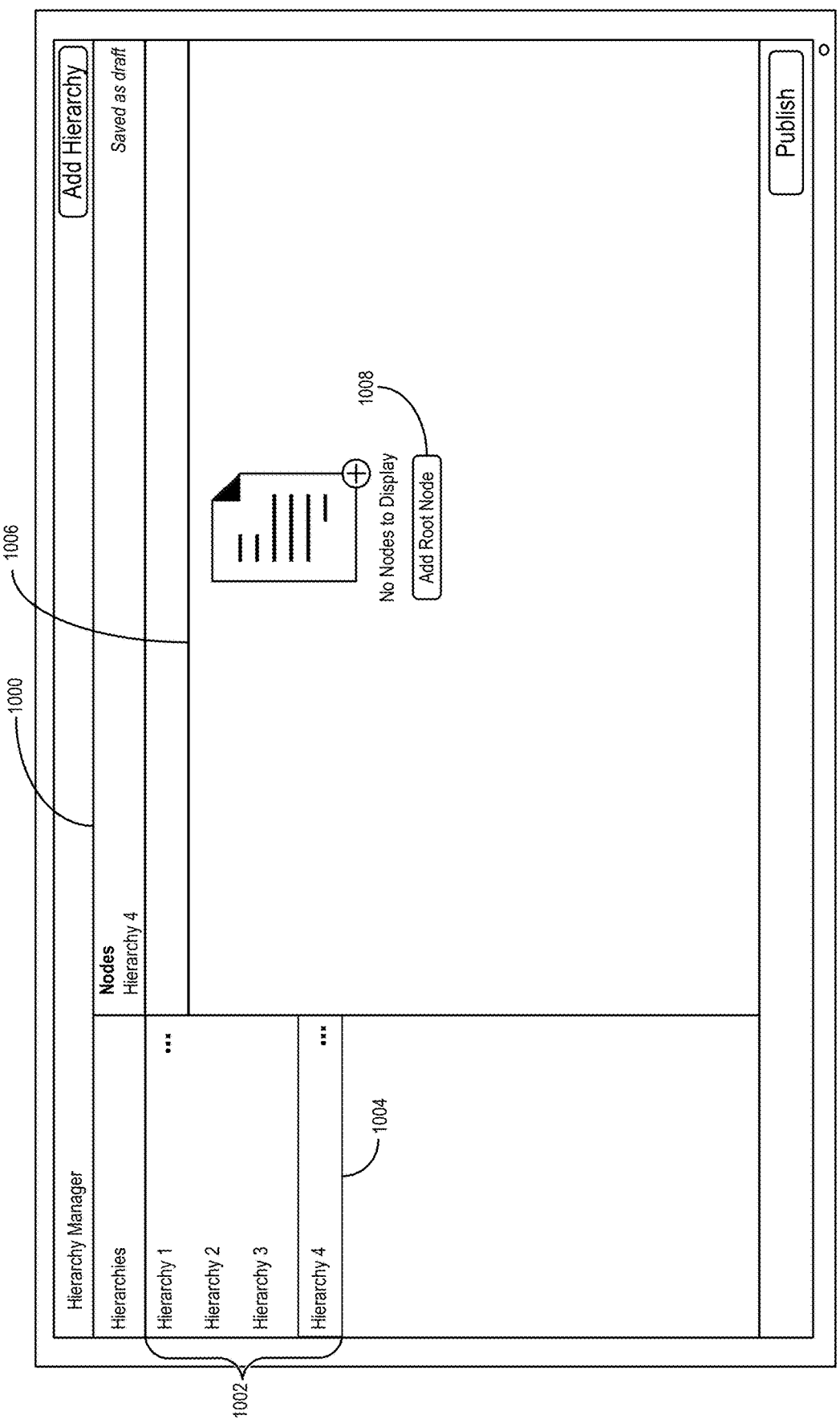
FIG. 10 illustrates an example of a graphical user interface for generating a taxonomy hierarchy in accordance with one or more embodiments.

In one or more embodiments, the digital taxonomy library system 102 provides options for viewing details associated with one or more taxonomies associated with one or more domains in the domain register. For instance, FIG. 10 illustrates a graphical user interface for viewing, modifying, or deleting one or more taxonomies associated with one or more domains. In particular, as illustrated in FIG. 10, a client device displays a hierarchy manager interface 1000 including one or more taxonomies generated in connection with data processes of an entity.

As illustrated in FIG. 10, the client device displays a plurality of available taxonomies associated with one or more data processes. To illustrate, the client device displays a taxonomy set 1002 including the available taxonomies. Additionally, in response to a selection of a taxonomy (e.g., a selected taxonomy 1004), the client device displays taxonomy details 1006 including a current structure of the selected taxonomy 1004. For example, the client device communicates with the digital taxonomy library system 102 to obtain a taxonomy hierarchy for the selected taxonomy 1004, including one or more nodes (if any) that have been generated and connected within the taxonomy hierarchy.

In one or more aspects, the client device displays an add root node element 1008 for adding a root node to the selected taxonomy 1004. Specifically, in response to the digital taxonomy library system 102 determining that the selected taxonomy 1004 has no root nodes (e.g., a root set for the selected taxonomy 1004 is empty), the client device can display the add root node element 1008. Alternatively, the client device can display one or more options for adding one or more additional root nodes to the selected taxonomy 1004 in response to the digital taxonomy library system 102 determining that the selected taxonomy 1004 has one or more existing root nodes.

Figure 11:
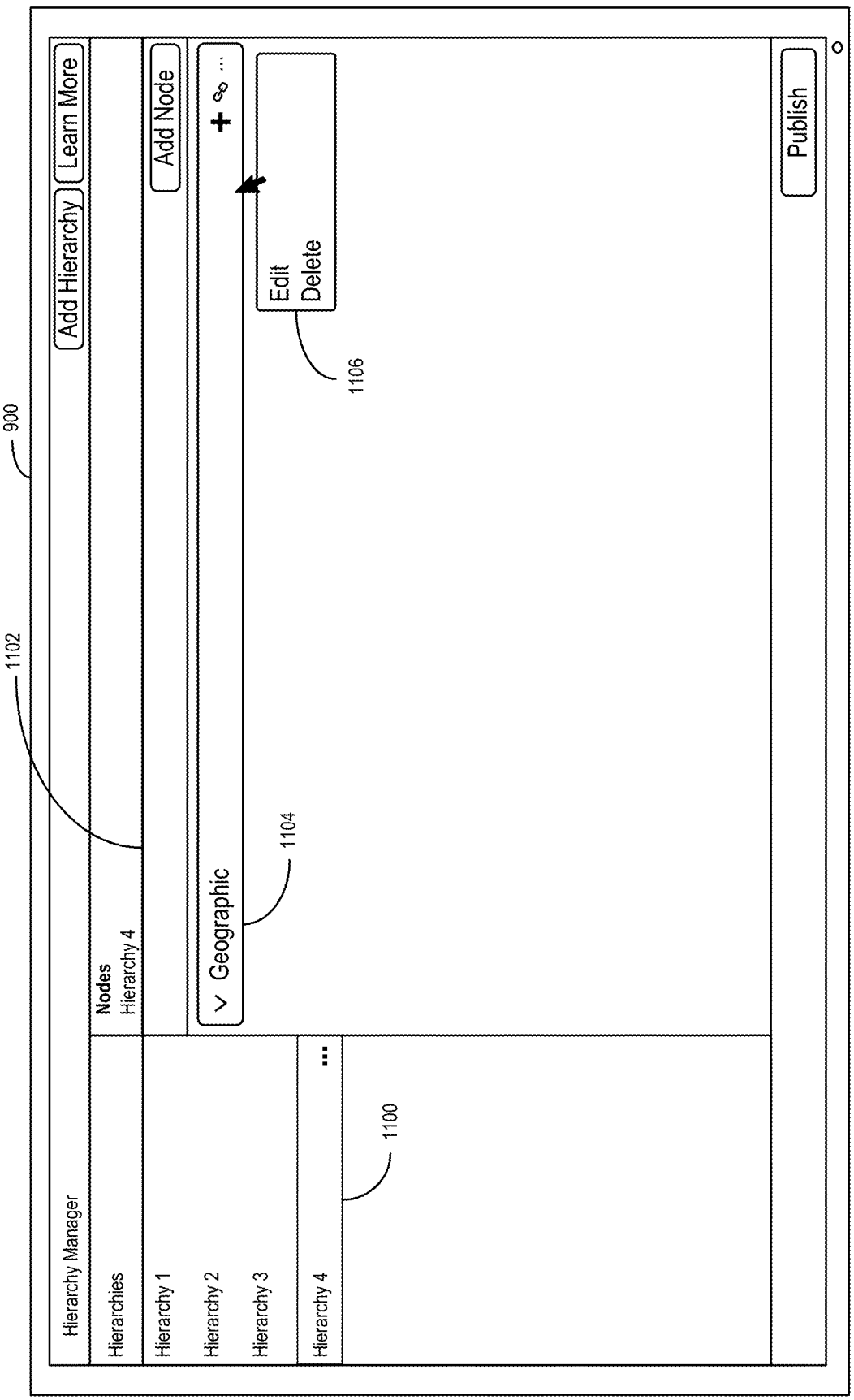
FIG. 11 illustrates an example of a graphical user interface for modifying a node in a taxonomy hierarchy in accordance with one or more embodiments.

According to one or more embodiments, the digital taxonomy library system 102 generates a taxonomy hierarchy for display at the client device in response to generating one or more root nodes. For example, FIG. 11 illustrates a graphical user interface of a client device for displaying a taxonomy hierarchy including one or more nodes. As mentioned, the digital taxonomy library system 102 generates the taxonomy hierarchy to include the one or more nodes in connection with a data process provided by, or utilized by, one or more computing systems associated with an entity. Accordingly, the client device provides a variety of tools for viewing and/or further modifying the taxonomy hierarchy.

In one or more aspects, in response to an indication of a selected taxonomy 1100, the client device displays taxonomy details 1102 including an indication of the one or more nodes of the selected taxonomy 1100. For instance, the client device displays a root node 1104 added to the taxonomy in response to a request to add the root node 1104 to the selected taxonomy 1100. Furthermore, the client device can display the root node 1104 with an option to collapse or expand the taxonomy details 1102 (e.g., at the root node or at a category or sub-category node).

In one or more embodiments, the digital taxonomy library system 102 also provides one or more options to modify an existing node in the selected taxonomy 1100. In particular, FIG. 11 illustrates an overlay 1106 including options to edit or delete an existing node in response to hovering over or selecting a node (e.g., the root node 1104). For example, in response to an input to edit the root node 1104, the client device can display additional options for modifying one or more characteristics, such as a name, one or more child nodes, a position of the root node 1104 in the taxonomy hierarchy, and/or other details. In additional aspects, in response to a selection to delete the selected node, the client device removes the node from the taxonomy hierarchy. In some embodiments, removing a node causes the digital taxonomy library system 102 to remove one or more child nodes or to move the child nodes up a level in the taxonomy hierarchy. Additionally, in various embodiments, the digital taxonomy library system 102 performs node linking/unlinking events synchronously (e.g., in the same transaction context as editing the taxonomy hierarchy), asynchronously for each input, or in a change log that captures all edits and applies the changes asynchronously in response to a publish action.

Figure 12:
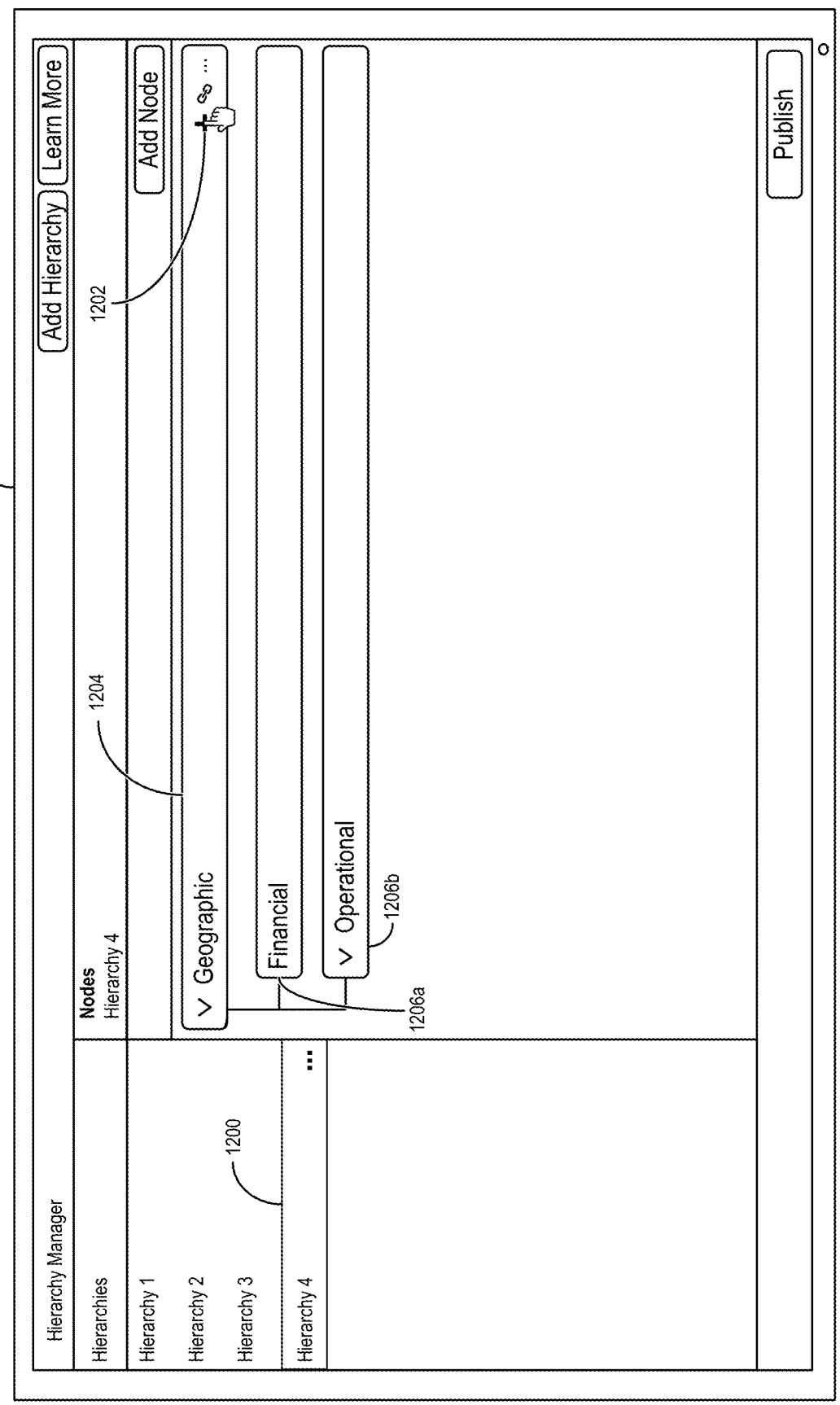
FIG. 12 illustrates an example of a graphical user interface for adding nodes to a taxonomy hierarchy in accordance with one or more embodiments.

In some aspects the client device also provides options to add one or more nodes to a selected taxonomy. FIG. 12 illustrates a graphical user interface of a client device for adding a node to a selected taxonomy 1200. Specifically, the client device can display an add node element 1202 in connection with a particular node in the selected taxonomy 1200. In response to detecting an interaction with the add node element 1202, the client device adds a node at the location indicated within the selected taxonomy. For example, the client device can add the new node as a child node to the selected node. To illustrate, in response to determining that the add node element 1202 corresponds to a root node 1204, the client device adds the new node as a child node to the root node 1204. FIG. 12 illustrates that the selected taxonomy 1200 includes a first child node 1206a or a second child node 1206b as a child node to the root node 1204.

In response to adding one or more root nodes and/or modifying one or more nodes in the selected taxonomy 1200, the digital taxonomy library system 102 generates or modifies corresponding node data objects representing the nodes. For instance, the digital taxonomy library system 102 generates a node data object representing the root node 1204. Additionally, in response to adding one or more child nodes to the selected taxonomy 1200, the digital taxonomy library system 102 also adds the one or more child nodes to a child set of the node data object representing the root node 1204. The digital taxonomy library system 102 also adds the node data object representing the root node 1204 to the parent set of node data objects representing the one or more child nodes. Accordingly, the digital taxonomy library system 102 generates a plurality of node data objects and links the node data objects together according to the taxonomy hierarchy of the selected taxonomy 1200 for use in generating a visual representation of the selected taxonomy 1200 within the graphical user interface.

Figure 13:
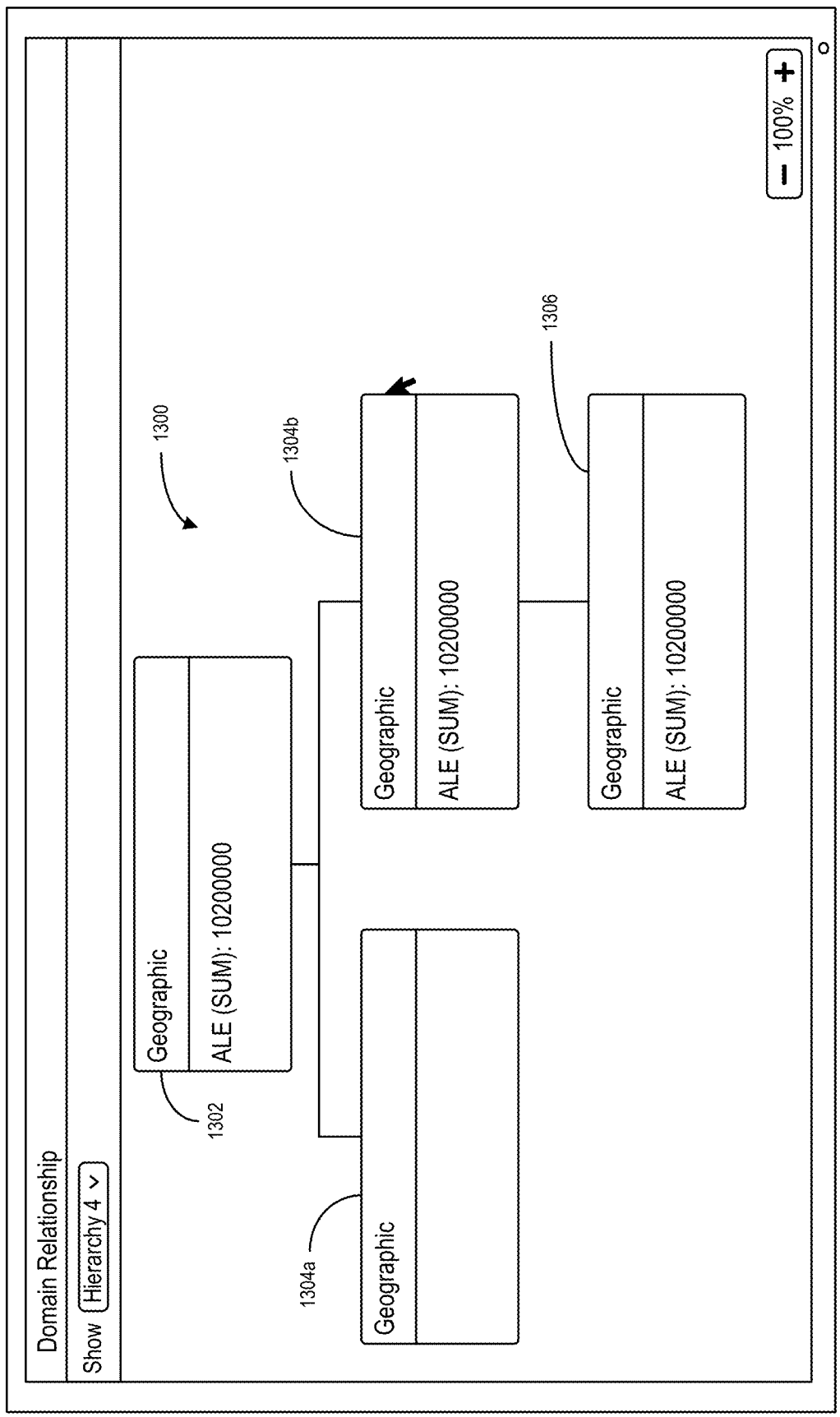
FIG. 13 illustrates an example of a graphical user interface displaying a graph-based taxonomy corresponding to a taxonomy hierarchy in accordance with one or more embodiments.

In additional embodiments, the digital taxonomy library system 102 generates a visual representation of a taxonomy by generating a graph-based taxonomy. FIG. 13 illustrates an example of a graph-based taxonomy 1300 including nodes according to a taxonomy hierarchy of a selected taxonomy. In particular, the graph-based taxonomy 1300 includes a plurality of nodes the digital taxonomy library system 102 connects according to metadata stored in each of the corresponding node data objects. The digital taxonomy library system 102 provides the graph-based taxonomy 1300 as a visual representation of the metadata stored in the node data objects by generating visual lines connecting related nodes. For example, the client device displays the graph-based taxonomy 1300 including a root node 1302 (e.g., corresponding to a domain), a first child node 1304a and a second child node 1304b (e.g., corresponding to categories within the domain), and an additional child node 1306 (e.g., corresponding to a sub-category of a category). To illustrate, the client device displays the root node 1302 connected to the first child node 1304a and the second child node 1304b in response to determining that the root node 1302 includes a child set with the first child node 1304a and the second child node 1304b and that the first child node 1304a and the second child node 1304b include parent sets with the root node 1302.

In one or more embodiments, the digital taxonomy library system 102 generates the graph-based taxonomy 1300 to include information associated with one or more attributes. For example, the client device displays the graph-based taxonomy 1300 to include attributes that have been assigned to one or more of the nodes. To illustrate, the client device displays the additional child node 1306 to include an attribute (e.g., a measurement corresponding to a computing system represented by the additional node).

Furthermore, the digital taxonomy library system 102 aggregates attribute values within the graph-based taxonomy 1300 according to a selected aggregation operation. As illustrated in FIG. 13, the digital taxonomy library system 102 determines that the second child node 1304b has an associated attribute value equal to the attribute value of the additional child node 1306 in response to determining that the attribute value of the additional child node 1306 aggregates up to the second child node 1304b according to a summing aggregation operation. Furthermore, the digital taxonomy library system 102 determines that the root node 1302 also is associated with an attribute value based on the attribute value of the additional child node 1306 (via the second child node 1304b) based on the summing aggregation operation. As shown, because the first child node 1304a does not have an associated attribute value corresponding to the attribute of the additional child node 1306, the digital taxonomy library system 102 determines the attribute value of the root node 1302 based on only on the right branch of the graph-based taxonomy 1300. The client device thus displays the attribute values and aggregation of attribute values with the corresponding nodes in the graph-based taxonomy 1300.

Figure 14:
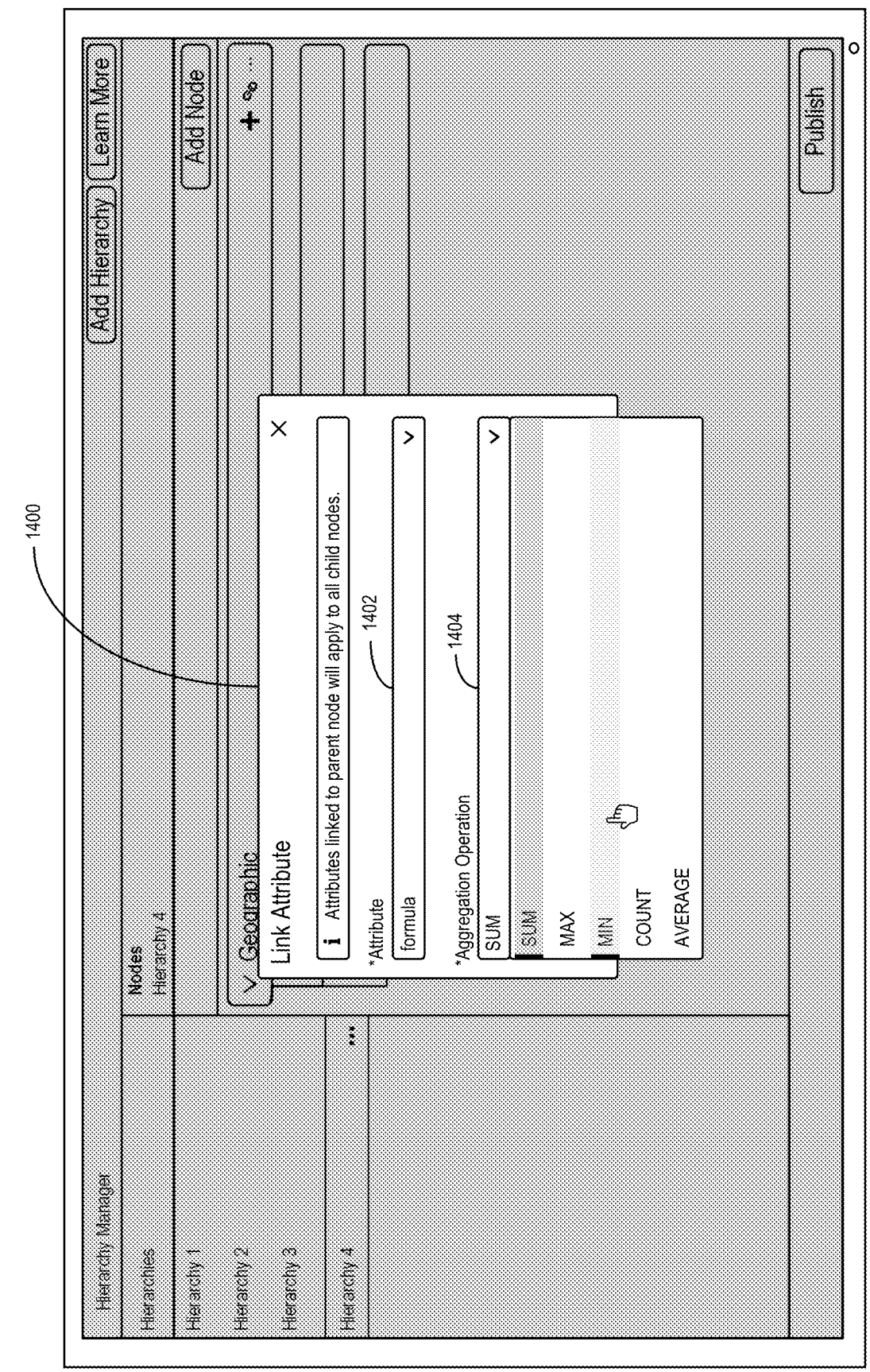
FIG. 14 illustrates an example of a graphical user interface for linking an attribute to a node in a taxonomy hierarchy in accordance with one or more embodiments.

In one or more aspects, the digital taxonomy library system 102 provides tools for generating, editing, deleting, or otherwise interacting with attributes associated with one or more nodes in a graph-based taxonomy. FIG. 14 illustrates a graphical user interface of a client device displaying an attribute overlay 1400 to customize an attribute for a node. In particular, in response to a selection to assign an attribute to a node (e.g., a root node or a category node), the client device displays the attribute overlay 1400. As illustrated, the client device displays the attribute overlay 1400 to include an attribute option 1402 to define a particular attribute for the node. As an example, the client device can detect a selection of a specific formula, annualized loss expectancy, processing attribute of a set of computing systems, etc.

Furthermore, the client device displays the attribute overlay 1400 to include an aggregation option 1404 to define a particular aggregation operation (e.g., sum, max, min, count, average) for combining attribute values of the selected attribute. Specifically, the aggregation option 1404 includes a drop-down menu with a set of predefined aggregation operations or contextual aggregation operations corresponding to the selected attribute. Additionally, in response to a selection of a particular aggregation operation (and/or a selection of a linking option to assign the attribute to the node), the digital taxonomy library system 102 links the corresponding node data object to the attribute data object of the selected attribute. The digital taxonomy library system 102 can also link the attribute data object of the selected attribute to one or more additional node data objects based on the taxonomy hierarchy (e.g., by automatically linking the attribute data object to child nodes of the selected node). The digital taxonomy library system 102 can add attribute metadata to the linked node data objects to indicate one or more attribute values and/or aggregation operations for the selected attribute.

Figure 15:
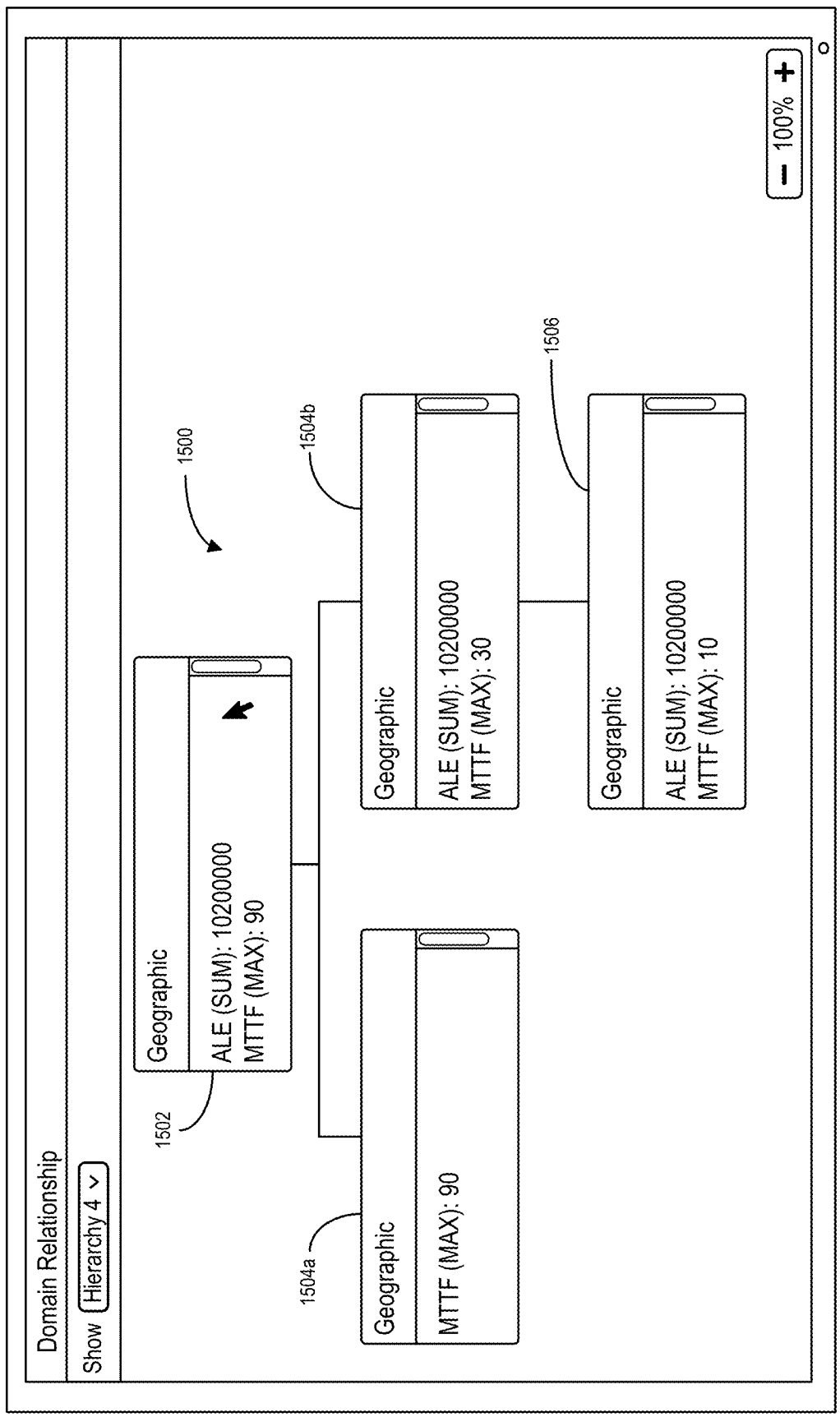
FIG. 15 illustrates an example of a graphical user interface displaying an updated graph-based taxonomy corresponding to a taxonomy hierarchy in response to linking an attribute to one or more nodes in accordance with one or more embodiments.

In response to linking an attribute to a particular node in a taxonomy, the digital taxonomy library system 102 can also update a graph-based taxonomy associated with the taxonomy. For instance, FIG. 15 illustrates that a client device displays an updated graph-based taxonomy 1500 including an additional attribute for various nodes. More specifically, the digital taxonomy library system 102 modifies the graph-based taxonomy 1300 of FIG. 13 to include an additional attribute for a plurality of nodes and generate the updated graph-based taxonomy 1500 of FIG. 15.

As illustrated in FIG. 15, the client device displays the updated graph-based taxonomy 1500 including a root node 1502, a first child node 1504a and a second child node 1504b of the root node 1502, and an additional child node 1506 as a child to the second child node 1504b. In one or more aspects, the digital taxonomy library system 102 adds a selected attribute to the nodes of the updated graph-based taxonomy 1500. In response to adding the attribute to the nodes, or otherwise in connection with linking the attribute to the nodes, the digital taxonomy library system 102 determines attribute values associated with the linked attribute for the corresponding nodes.

To illustrate, the digital taxonomy library system 102 can determine the attribute values in response to one or more inputs via the client device (or another client device with access to the updated graph-based taxonomy 1500). In additional examples, the digital taxonomy library system 102 can determine the attribute values for one or more nodes in the updated graph-based taxonomy 1500 by communicating with one or more computing devices associated with the node(s). For example, the digital taxonomy library system 102 can utilize the node data objects associated with a plurality of nodes to determine devices associated with the nodes and extract data from the devices indicating the attribute values (e.g., by extracting processing loads from the devices). In some aspects, the digital taxonomy library system 102 utilizes a plurality of sources (e.g., user inputs, data objects, computing devices) to obtain an attribute value for a given node. Furthermore, in one or more embodiments, the digital taxonomy library system 102 determines the sources (e.g., an input set) for the attribute values from node data objects (e.g., from attribute metadata of the node data objects).

In response to determining the attribute values for the nodes, the digital taxonomy library system 102 stores the attribute values in the node data objects corresponding to the nodes. More specifically, the digital taxonomy library system 102 stores the attribute values with attribute metadata of the node data objects. The client device displays the attribute values for the nodes by accessing the attribute metadata of the corresponding node data objects. To illustrate, the client device displays a first attribute value for a new attribute linked to the additional child node 1506, a second attribute value for the new attribute linked to the second child node 1504b, etc.

Furthermore, as illustrated in FIG. 15, the digital taxonomy library system 102 aggregates attribute values within the updated graph-based taxonomy 1500 according to the attribute values of the nodes and the selected aggregation operation. Specifically, FIG. 15 illustrates that the new attribute has an aggregation operation of determining a maximum value from linked nodes. Accordingly, the digital taxonomy library system 102 determines the maximum value of all nodes with the attribute that are children of each node and provides the aggregated attribute value(s) for display in the updated graph-based taxonomy 1500 at the client device. Thus, in response to determining that the first child node 1504a has an attribute value higher than an attribute value of the second child node 1504b, the digital taxonomy library system 102 also determines the aggregated attribute value for the root node 1502 from the attribute value of the first child node 1504a. In alternative examples, the digital taxonomy library system 102 determines attribute values for a particular attribute by summing attribute values of child nodes, finding a minimum attribute value of the child nodes, determining an average, etc.

In one or more embodiments, the digital taxonomy library system 102 also provides options to modify existing attributes of a graph-based taxonomy. For instance, the client device can display an option to change an aggregation operation for a particular attribute. In response to a request to modify the aggregation operation, the digital taxonomy library system 102 can modify one or more node data objects to indicate the updated aggregation operations. Additionally, the digital taxonomy library system 102 can update the aggregated attribute values for the graph-based taxonomy based on the updated aggregation operation and provide an indication of the updated aggregated attribute values with the graph-based taxonomy in a graphical user interface. To illustrate, in response to changing an aggregation operation for an attribute from a maximum aggregation operation to an average aggregation operation, the digital taxonomy library system 102 aggregates the attribute values by determining the average aggregation and updating visual representations of nodes to reflect the updated aggregation.

Furthermore, the digital taxonomy library system 102 can update aggregated attribute values in response to changes to a taxonomy hierarchy. Specifically, the digital taxonomy library system 102 can detect that a node has been added, moved, or deleted in a particular position of the taxonomy hierarchy. For example, in response to adding a node to the taxonomy hierarchy (e.g., adding a leaf node linked to the first child node 1504a), the digital taxonomy library system 102 can determine that the added node inherits a particular attribute. The digital taxonomy library system 102 can determine an attribute value for the added node and update the aggregated attribute values for one or more nodes based on the added node. Additionally, in response to removing or moving a node, the digital taxonomy library system 102 can update the aggregated attribute values at the affected locations in the taxonomy hierarchy accordingly.

Furthermore, by utilizing node data objects and attribute data objects to represent nodes and attributes, respectively, the digital taxonomy library system 102 can efficiently generate graph-based taxonomies for a number of domains. In particular, the digital taxonomy library system 102 can link attribute data objects to various nodes across more than one taxonomy. Accordingly, the digital taxonomy library system 102 can also determine attribute values for various nodes that connect to more than one taxonomy and use the attribute values to determine the impact of the attribute values across the different taxonomies. Furthermore, the digital taxonomy library system 102 can generate visual representations of the graph-based taxonomies to illustrate the impacts of the different attribute values across the different domains.

In one or more aspects, the digital taxonomy library system 102 also provides tools for implementing changes to one or more data processes based on one or more aggregated attribute values. For example, in response to determining that an aggregated attribute value for a node (e.g., a root node) meets a threshold value, the digital taxonomy library system 102 can provide a notification of the threshold value. To illustrate, the digital taxonomy library system 102 can generate a notification for display at a client device of an administrator of one or more computing systems associated with a domain of the graph-based taxonomy to notify the administrator that the aggregated attribute value meets the threshold value. Thus, the digital taxonomy library system 102 can manage the impacts of various attributes within and across domains via the respective node and attribute data objects and provide real-time monitoring/tracking of those impacts to one or more client devices.

The digital taxonomy library system 102 can also provide one or more options to implement a control based on the aggregated attribute value meeting the threshold value. To illustrate, in response to determining that a particular risk value of a domain node corresponding to a particular data process meets a threshold value, the digital taxonomy library system 102 can provide a recommendation or an option to implement a security protocol to mitigate the corresponding risk (e.g., by applying an encryption control at one or more computing devices). In additional aspects, the digital taxonomy library system 102 automatically implements one or more controls on one or more computing systems in response to a particular aggregated attribute value meeting a threshold value.

Turning now to FIG. 16, this figure shows a flowchart of a process 1600 of linking an attribute to nodes in a graph-based taxonomy via corresponding data objects and aggregating attribute values for the attribute. While FIG. 16 illustrates acts according to one embodiment, alternative embodiments may omit, add to, reorder, and/or modify any of the acts shown in FIG. 16. The acts of FIG. 16 can be performed as part of a method. Alternatively, a non-transitory computer readable medium can comprise instructions, that when executed by one or more processors, cause a computing device to perform the acts of FIG. 16. In still further embodiments, a system can perform the acts of FIG. 16.

As shown, the process 1600 includes an act 1602 of generating node data objects representing a domain and categories of the domain within a graph-based taxonomy. In some aspects, act 1602 is implemented using one or more examples described above with respect to FIGS. 2, 4, 6, and 10-12. The process 1600 also includes an act 1604 of receiving an input to assign an attribute to a selected node data object. As part of act 1604, the process 1600 includes an act 1604a of generating an attribute data object. As part of act 1604, the process 1600 also includes an act 1604b of linking the attribute data object to node data objects. In some aspects, acts 1604, 1604a, and 1604b are implemented using one or more examples described above with respect to FIGS. 2-4, 6, and 13-15. The process 1600 includes an act 1606 of determining aggregated attribute values. In some aspects, act 1606 is implemented using one or more examples described above with respect to FIGS. 3, 4, 7, 13, and 15. Additionally, the process 1600 includes an act 1608 of providing an indication of the aggregated attribute values for display via a graphical user interface. In some aspects, act 1608 is implemented using one or more examples described above with respect to FIGS. 2, 13, and 15.

In one or more embodiments, act 1602 involves generating, in response to inputs via one or more client devices, a plurality of node data objects representing a domain and a plurality of categories of the domain within a graph-based taxonomy in connection with one or more computing systems providing one or more data processes associated with the domain. Act 1602 can involve determining, for a node data object of the plurality of node data objects, a node label in response to determining that the inputs indicate that the node data object corresponds to the domain or a category. Act 1602 can further involve generating a node comprising the node label for display within a visual representation of the graph-based taxonomy in the graphical user interface.

Act 1604 an involve, in response to an additional input via the one or more client devices to assign an attribute to a selected node data object of the plurality of node data objects. Act 1604a can involve generating an attribute data object representing the attribute. Act 1604b can involve linking the attribute data object to one or more node data objects of the plurality of node data objects according to one or more child relationships or one or more parent relationships corresponding to the selected node data object.

Act 1604 can involve receiving a request to assign the attribute to the selected node data object in response to the additional input indicating selecting a node of a visual representation of the graph-based taxonomy. Act 1604 can also involve generating an attribute data object comprising: an aggregation operation for determining the aggregated attribute values; and an attribute label for display within a visual representation of the graph-based taxonomy in the graphical user interface.

Act 1604 can involve storing a plurality of aggregation operation types for the attribute within the attribute data object. Act 1604 can also involve storing, in response to the additional input, an indication of a selected aggregation operation type of the plurality of aggregation operation types in the one or more node data objects.

Act 1604 can involve generating, within the selected node data object, a parent set comprising one or more node identifiers for one or more additional node data objects with a parent relationship to the selected node data object. Act 1604 can also involve generating, within the selected node data object, a child set comprising one or more node identifiers for one or more additional node data objects with a child relationship to the selected node data object.

Act 1604 can involve determining that an additional node data object of the plurality of node data objects inherits the attribute of the selected node data object in response to determining that the additional node data object has a child relationship of the selected node data object according to a child set stored in the selected node data object. Act 1604 can involve linking the attribute data object to the additional node data object by storing an attribute identifier of the attribute data object in the additional node data object.

Act 1606 can involve determining aggregated attribute values for the attribute according to the attribute data object linked to the one or more node data objects within the graph-based taxonomy. Act 1606 can involve determining that the one or more node data objects are linked to the attribute data object in response to detecting an attribute identifier of the attribute data object from attribute metadata in the one or more node data objects. Act 1606 can also involve generating the aggregated attribute values by aggregating one or more attribute values extracted from attribute metadata in the one or more node data objects according to an aggregation operation indicated by the one or more node data objects.

Act 1606 can involve determining one or more measurement nodes linked to the one or more node data objects associated with the attribute data object. Act 1606 can also involve generating the aggregated attribute values by utilizing the aggregation operation indicated by the one or more node data objects to aggregate one or more attribute values indicated by the one or more measurement nodes.

Act 1608 can involve providing an indication of the aggregated attribute values for display via a graphical user interface of the one or more client devices. For example, act 1608 can involve determining one or more attribute values corresponding to the one or more node data objects linked to the attribute data object. Act 1608 can also involve generating, for display in the graphical user interface of the one or more client devices, one or more indicators of the one or more attribute values with one or more node elements representing the one or more node data objects. Act 1608 can further include generating, for display in the graphical user interface of the one or more client devices, the indication of the aggregated attribute values with a root node element of the graph-based taxonomy associated with the one or more node elements.

In one or more embodiments, the process 1600 includes generating, utilizing a cross-domain digital library of executable operations and in response to inputs via one or more client devices, a plurality of node data objects representing a domain and a plurality of categories of the domain within a graph-based taxonomy in connection with one or more computing systems providing one or more data processes associated with the domain.

The process 1600 can include, in response to an additional input via the one or more client devices to assign an attribute to a selected node data object of the plurality of node data objects, utilize the cross-domain digital library of executable operations. For example, the process 1600 can include generating an attribute data object representing the attribute and determining, utilizing the graph-based taxonomy, one or more child relationships or one or more parent relationships corresponding to the selected node data object. The process 1600 can further include modifying the graph-based taxonomy by linking the attribute data object to the selected node data object and one or more node data objects of the plurality of node data objects according to the one or more child relationships or the one or more parent relationships.

The process 1600 can also include determining aggregated attribute values for the attribute according to the attribute data object linked to the one or more node data objects within the modified graph-based taxonomy. Additionally, the process 1600 can include providing an indication of the aggregated attribute values for display via a graphical user interface of the one or more client devices.

The process 1600 can also include generating the plurality of node data objects representing the domain and the plurality of categories by generating an initial node data object corresponding to the domain and a plurality of additional node data objects corresponding to the plurality of categories. The process 1600 can additionally include linking the initial node data object to the plurality of additional node data objects by generating metadata within the initial node data object and the plurality of additional node data objects indicating the one or more child relationships or the one or more parent relationships.

The process 1600 can include generating an attribute identifier indicating the attribute, determining one or more aggregation operations associated with the attribute, and generating the attribute data object comprising the attribute identifier and the one or more aggregation operations.

The process 1600 can also include determining the one or more child relationships or the one or more parent relationships corresponding to the selected node data object by accessing the selected node data object to determine a first subset of node data objects of a child set or a second subset of node data objects of a parent set associated with the selected node data object. Also, the process 1600 can include modifying the graph-based taxonomy by generating attribute metadata corresponding to the attribute data object in the first subset of node data objects or the second subset of node data objects.

The process 1600 can include determining an aggregation operation for the attribute from the attribute data object. Additionally, the process 1600 can include determining attribute values corresponding to the one or more node data objects linked to the attribute data object. The process 1600 can also include aggregating the attribute values according to the aggregation operation.

In one or more aspects, the process 1600 includes detecting a request to add an additional node data object having a child relationship or a parent relationship with the selected node data object within the graph-based taxonomy. The process 1600 can also include modifying the graph-based taxonomy by linking the additional node data object to the selected node data object and the attribute data object in response to the additional node data object having the child relationship or the parent relationship with the selected node data object.

The process 1600 can include determining attribute values from one or more measurement nodes corresponding to the one or more node data objects and the additional node data object. The process 1600 can also include updating the aggregated attribute values according to the one or more measurement nodes and an aggregation operation from the attribute data object.

The process 1600 can further include determining, in response to a request to add an additional node data object to the graph-based taxonomy, a child relationship of the additional node data object with the selected node data object. Additionally, the process 1600 can include linking the additional node data object to the selected node data object and the attribute data object within the graph-based taxonomy according to the child relationship. The process 1600 can also include determining updated aggregated attribute values for the attribute in response to linking the additional node data object to the selected node data object and the attribute data object.

In some aspects, the process 1600 includes determining, in response to a request to modify the attribute data object, an updated aggregation operation for the attribute. The process 1600 can also include determining attribute values associated with the one or more node data objects linked to the attribute data object. The process 1600 can further include determining updated aggregated attribute values for the attribute utilizing the attribute values and the updated aggregation operation. Additionally, the process 1600 can include providing an updated indication of the updated aggregated attribute values for display via the graphical user interface of the one or more client devices.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
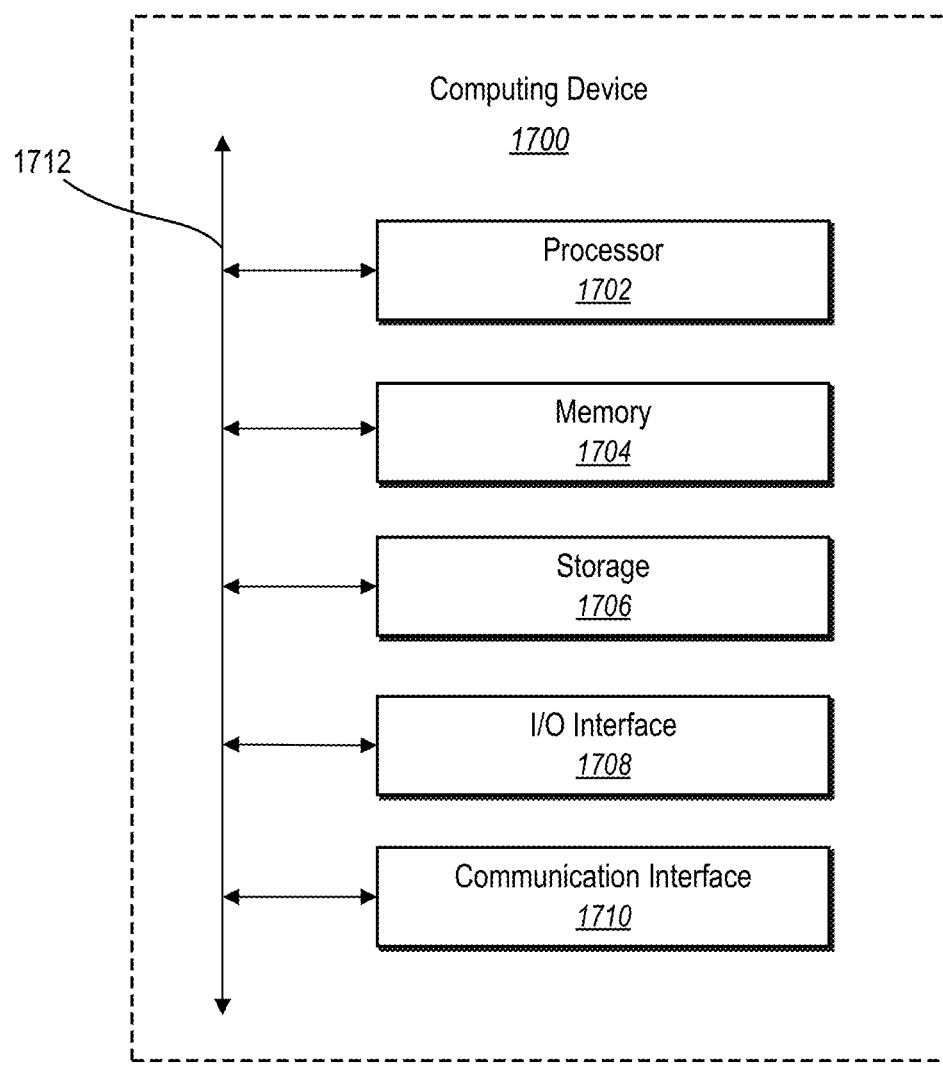
FIG. 17 illustrates an example of a computing device in accordance with one or more embodiments.

FIG. 17 illustrates a block diagram of exemplary computing device 1700 that may be configured to perform one or more of the processes described above. One will appreciate that one or more computing devices such as the computing device 1700 may implement the system(s) of FIG. 1. As shown by FIG. 17, the computing device 1700 can comprise a processor 1702, a memory 1704, a storage device 1706, an I/O interface 1708, and a communication interface 1710, which may be communicatively coupled by way of a communication infrastructure 1712. In certain embodiments, the computing device 1700 can include fewer or more components than those shown in FIG. 17. Components of the computing device 1700 shown in FIG. 17 will now be described in additional detail.

In one or more embodiments, the processor 1702 includes hardware for executing instructions, such as those making up a computer program. As an example, and not by way of limitation, to execute instructions for dynamically modifying workflows, the processor 1702 may retrieve (or fetch) the instructions from an internal register, an internal cache, the memory 1704, or the storage device 1706 and decode and execute them. The memory 1704 may be a volatile or non-volatile memory used for storing data, metadata, and programs for execution by the processor(s). The storage device 1706 includes storage, such as a hard disk, flash disk drive, or other digital storage device, for storing data or instructions for performing the methods described herein.

The I/O interface 1708 allows a user to provide input to, receive output from, and otherwise transfer data to and receive data from computing device 1700. The I/O interface 1708 may include a mouse, a keypad or a keyboard, a touch screen, a camera, an optical scanner, network interface, modem, other known I/O devices or a combination of such I/O interfaces. The I/O interface 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1708 is configured to provide graphical data to a display for presentation to a user. The graphical data may be representative of one or more graphical user interfaces and/or any other graphical content as may serve a particular implementation.

The communication interface 1710 can include hardware, software, or both. In any event, the communication interface 1710 can provide one or more interfaces for communication (such as, for example, packet-based communication) between the computing device 1700 and one or more other computing devices or networks. As an example, and not by way of limitation, the communication interface 1710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1710 may facilitate communications with various types of wired or wireless networks. The communication interface 1710 may also facilitate communications using various communication protocols. The communication infrastructure 1712 may also include hardware, software, or both that couples components of the computing device 1700 to each other. For example, the communication interface 1710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
generating, by processing hardware in response to inputs via one or more client devices, a plurality of node data objects representing a domain and a plurality of categories of the domain within a graph-based taxonomy in connection with one or more computing systems providing one or more data processes associated with the domain;
in response to an additional input via a visual representation of the plurality of node data objects in the graph-based taxonomy in a graphical user interface at the one or more client devices to assign an attribute to a selected node data object of the plurality of node data objects:
generating, by the processing hardware, an attribute data object representing the attribute; and
linking, by the processing hardware, the attribute data object to one or more node data objects of the plurality of node data objects according to one or more child relationships or one or more parent relationships corresponding to the selected node data object;
aggregating, by the processing hardware, one or more attribute values to generate aggregated attribute values for the attribute according to the attribute data object linked to the one or more node data objects within the graph-based taxonomy; and
providing, by the processing hardware, an indication of the aggregated attribute values for display within the visual representation of the plurality of node data objects in the graph-based taxonomy via the graphical user interface of the one or more client devices.

2. The computer-implemented method of claim 1, wherein generating the plurality of node data objects representing the domain and the plurality of categories comprises:
determining, for a node data object of the plurality of node data objects, a node label in response to determining that the inputs indicate that the node data object corresponds to the domain or a category; and
generating a node comprising the node label for display within the visual representation of the plurality of node data objects in the graph-based taxonomy in the graphical user interface.

3. The computer-implemented method of claim 1, wherein generating the attribute data object comprises:
receiving a request to assign the attribute to the selected node data object in response to the additional input comprising a selection of a node via the visual representation of the graph-based taxonomy; and
generating the attribute data object comprising:
an aggregation operation for determining the aggregated attribute values indicated by the additional input via the visual representation; and
an attribute label for display within the visual representation of the graph-based taxonomy in the graphical user interface.

4. The computer-implemented method of claim 1, wherein:

generating the attribute data object comprises storing a plurality of aggregation operation types for the attribute within the attribute data object; and linking the attribute data object to the one or more node data objects comprises storing, in response to the additional input, an indication of a selected aggregation operation type of the plurality of aggregation operation types in the one or more node data objects.

5. The computer-implemented method of claim 1, wherein linking the attribute data object to the one or more node data objects comprises generating, within the selected node data object, a parent set comprising one or more node identifiers for one or more additional node data objects with a parent relationship to the selected node data object.

6. The computer-implemented method of claim 1, wherein linking the attribute data object to the one or more node data objects comprises generating, within the selected node data object, a child set comprising one or more node identifiers for one or more additional node data objects with a child relationship to the selected node data object.

7. The computer-implemented method of claim 1, wherein linking the attribute data object to the one or more node data objects comprises:

determining that an additional node data object of the plurality of node data objects inherits the attribute of the selected node data object in response to determining that the additional node data object has a child relationship of the selected node data object according to a child set stored in the selected node data object; and linking the attribute data object to the additional node data object by storing an attribute identifier of the attribute data object in the additional node data object.

8. The computer-implemented method of claim 1, wherein aggregating the one or more attribute values to generate the aggregated attribute values comprises:

determining that the one or more node data objects are linked to the attribute data object in response to detecting an attribute identifier of the attribute data object from attribute metadata in the one or more node data objects; and generating the aggregated attribute values by aggregating the one or more attribute values extracted from attribute metadata in the one or more node data objects according to an aggregation operation indicated by the one or more node data objects.

9. The computer-implemented method of claim 8, wherein generating the aggregated attribute values comprises:

determining one or more measurement nodes linked to the one or more node data objects associated with the attribute data object; and generating the aggregated attribute values by utilizing the aggregation operation indicated by the one or more node data objects to aggregate the one or more attribute values indicated by the one or more measurement nodes.

10. The computer-implemented method of claim 1, wherein providing the indication of the aggregated attribute values comprises:

determining the one or more attribute values correspond to the one or more node data objects linked to the attribute data object;

generating, for display in the graphical user interface of the one or more client devices, one or more indicators of the one or more attribute values with one or more node elements representing the one or more node data objects; and generating, for display in the graphical user interface of the one or more client devices, the indication of the aggregated attribute values with a root node element of the graph-based taxonomy associated with the one or more node elements.

11. A system comprising:

one or more non-transitory computer readable media; and processing hardware configured to cause the system to:

generate, utilizing a cross-domain digital library of executable operations and in response to inputs via one or more client devices, a plurality of node data objects representing a domain and a plurality of categories of the domain within a graph-based taxonomy in connection with one or more computing systems providing one or more data processes associated with the domain;

in response to an additional input via a visual representation of the plurality of node data objects in the graph-based taxonomy in a graphical user interface at the one or more client devices to assign an attribute to a selected node data object of the plurality of node data objects, utilize the cross-domain digital library of executable operations to:

generate an attribute data object representing the attribute;

determine, utilizing the graph-based taxonomy, one or more child relationships or one or more parent relationships corresponding to the selected node data object; and modify the graph-based taxonomy by linking the attribute data object to the selected node data object and one or more node data objects of the plurality of node data objects according to the one or more child relationships or the one or more parent relationships;

aggregate one or more attribute values to generate aggregated attribute values for the attribute according to the attribute data object linked to the one or more node data objects within the modified graph-based taxonomy; and provide an indication of the aggregated attribute values for display within the visual representation of the plurality of node data objects in the graph-based taxonomy via the graphical user interface of the one or more client devices.

12. The system of claim 11, wherein the processing hardware is further configured to cause the system to generate the plurality of node data objects representing the domain and the plurality of categories by:

generating an initial node data object corresponding to the domain and a plurality of additional node data objects corresponding to the plurality of categories; and linking the initial node data object to the plurality of additional node data objects by generating metadata within the initial node data object and the plurality of additional node data objects indicating the one or more child relationships or the one or more parent relationships.

13. The system of claim 11, wherein the processing hardware is further configured to cause the system to generate the attribute data object by:

generating an attribute identifier indicating the attribute;

determining one or more aggregation operations associated with the attribute; and generating the attribute data object comprising the attribute identifier and the one or more aggregation operations.

14. The system of claim 11, wherein the processing hardware is further configured to cause the system to:
   determine the one or more child relationships or the one or more parent relationships corresponding to the selected node data object by accessing the selected node data object to determine a first subset of node data objects of a child set or a second subset of node data objects of a parent set associated with the selected node data object; and
   modify the graph-based taxonomy by generating attribute metadata corresponding to the attribute data object in the first subset of node data objects or the second subset of node data objects.

15. The system of claim 11, wherein the processing hardware is further configured to cause the system to aggregate the one or more attribute values to generate the aggregated attribute values for the attribute by:
   determining an aggregation operation for the attribute from the attribute data object;
   determining the one or more attribute values correspond to the one or more node data objects linked to the attribute data object; and
   aggregating the one or more attribute values according to the aggregation operation.

16. The system of claim 11, wherein the processing hardware is further configured to cause the system to:
   detect a request to add an additional node data object having a child relationship or a parent relationship with the selected node data object within the graph-based taxonomy; and
   modify the graph-based taxonomy by linking the additional node data object to the selected node data object and the attribute data object in response to the additional node data object having the child relationship or the parent relationship with the selected node data object.

17. The system of claim 16, wherein the processing hardware is further configured to cause the system to determine the aggregated attribute values for the attribute by:
   determining the one or more attribute values from one or more measurement nodes corresponding to the one or more node data objects and the additional node data object; and
   updating the aggregated attribute values according to the one or more measurement nodes and an aggregation operation from the attribute data object.

18. A non-transitory computer readable medium comprising instructions that, when executed by processing hardware, cause the processing hardware to perform operations comprising:
   generating, in response to inputs via one or more client devices, a plurality of node data objects representing a domain and a plurality of categories of the domain within a graph-based taxonomy in connection with one or more computing systems providing one or more data processes associated with the domain;
   in response to an additional input via a visual representation of the plurality of node data objects in the graph-based taxonomy in a graphical user interface at the one or more client devices to assign an attribute to a selected node data object of the plurality of node data objects:
      generating a attribute data object representing the attribute; and
      linking the attribute data object to the selected node data object and one or more node data objects of the plurality of node data objects according to one or more child relationships or one or more parent relationships corresponding to the selected node data object;
   aggregating one or more attribute values to generate aggregated attribute values for the attribute according to the attribute data object linked to the one or more node data objects within the graph-based taxonomy; and
   providing an indication of the aggregated attribute values for display within the visual representation of the plurality of node data objects in the graph-based taxonomy via the graphical user interface of the one or more client devices.

19. The non-transitory computer readable medium of claim 18, further comprising:
   determining, in response to a request to add an additional node data object to the graph-based taxonomy via the visual representation of the plurality of node data objects in the graph-based taxonomy, a child relationship of the additional node data object with the selected node data object;
   linking the additional node data object to the selected node data object and the attribute data object within the graph-based taxonomy according to the child relationship; and
   determining updated aggregated attribute values for the attribute in response to linking the additional node data object to the selected node data object and the attribute data object.

20. The non-transitory computer readable medium of claim 18, wherein the operations further comprise:
   determining, in response to a request to modify the attribute data object, an updated aggregation operation for the attribute;
   determining the one or more attribute values are associated with the one or more node data objects linked to the attribute data object;
   determining updated aggregated attribute values for the attribute utilizing the attribute values and the updated aggregation operation; and
   providing an updated indication of the updated aggregated attribute values for display via the graphical user interface of the one or more client devices.

* * * * *